United States Patent
Ashton

(10) Patent No.: US 12,539,214 B1
(45) Date of Patent: Feb. 3, 2026

(54) PROSTHETIC DEVICE

(71) Applicant: JointMedica Ltd., Hallow (GB)

(72) Inventor: Roger Ashton, Warwick (GB)

(73) Assignee: JointMedica Ltd., Hallow (GB)

( * ) Notice: Subject to any disclaimer, the term of this patent is extended or adjusted under 35 U.S.C. 154(b) by 0 days.

(21) Appl. No.: 19/087,253

(22) Filed: Mar. 21, 2025

Related U.S. Application Data

(63) Continuation-in-part of application No. 18/956,308, filed on Nov. 22, 2024, now Pat. No. 12,320,007.

(51) Int. Cl.
| | |
|---|---|
| *A61F 2/34* | (2006.01) |
| *A61L 27/16* | (2006.01) |
| *A61L 27/30* | (2006.01) |
| *A61L 27/50* | (2006.01) |
| *A61L 27/54* | (2006.01) |
| *A61F 2/30* | (2006.01) |

(52) U.S. Cl.
CPC .............. *A61F 2/34* (2013.01); *A61L 27/16* (2013.01); *A61L 27/306* (2013.01); *A61L 27/50* (2013.01); *A61L 27/54* (2013.01); *A61F 2002/30065* (2013.01); *A61F 2310/00407* (2013.01); *A61L 2300/22* (2013.01); *A61L 2300/428* (2013.01); *A61L 2400/18* (2013.01); *A61L 2430/24* (2013.01)

(58) Field of Classification Search
CPC .. A61F 2/34; A61F 2310/00407; A61L 27/50; A61L 27/28; A61L 2300/428; A61L 27/14
USPC ....................................................... 623/23.6
See application file for complete search history.

(56) References Cited

U.S. PATENT DOCUMENTS

| | | |
|---|---|---|
| 4,685,923 A | 8/1987 | Mathys |
| 6,896,703 B2 | 5/2005 | Barbieri et al. |
| 7,112,301 B2 | 9/2006 | Thorne |
| (Continued) | | |

FOREIGN PATENT DOCUMENTS

| | | | | |
|---|---|---|---|---|
| FR | 2986961 A1 | * | 8/2013 | ........... A61L 27/306 |
| WO | WO-0180778 A1 | * | 11/2001 | ................ C08J 3/28 |
| (Continued) | | | | |

OTHER PUBLICATIONS

Translation of FR 2986961 (Year: 2013).*

(Continued)

*Primary Examiner* — Brian E Pellegrino
(74) *Attorney, Agent, or Firm* — GREENBERG TRAURIG, LLP

(57) ABSTRACT

A prosthesis including a UHMWPE core and a coating, wherein the core is a cup-shaped core having a concave first side and a convex second side, wherein the UHMWPE has a weight average molecular weight that is from $2\times10^6$ to $3\times10^6$ grams per mole. The core has a tensile strength that is from 35 to 50 MPa. The coating layer coats the second side of the core. The coating includes titanium powder having a D50 particle size of from 200 to 250 microns. The coating has a mean thickness that is from 200 to 500 microns. The prosthesis is an acetabular cup prosthesis. When tested for abrasion resistance, the coating loses less than 65 milligrams when abraded for 100 cycles. The coating has a static shear bond strength that is from 15 to 25 MPa and a static tensile bond strength that is from 14 to 25 MPa.

14 Claims, 9 Drawing Sheets

(56) References Cited

U.S. PATENT DOCUMENTS

| | | |
|---|---|---|
| 7,767,250 B2 * | 8/2010 | Luan ................ A61L 27/06 |
| | | 623/23.57 |
| 7,947,083 B2 | 5/2011 | Ashton et al. |
| 8,277,514 B2 | 10/2012 | Ashton et al. |
| 8,679,187 B2 | 3/2014 | Allen et al. |
| 9,017,416 B2 | 4/2015 | McMinn |
| 9,445,906 B2 | 9/2016 | Ashton et al. |
| 9,463,093 B2 | 10/2016 | Allen et al. |
| 9,463,094 B2 | 10/2016 | Allen et al. |
| 9,649,193 B2 | 5/2017 | McMinn |
| 10,350,071 B2 | 7/2019 | Lerf et al. |
| 10,383,745 B2 | 8/2019 | Allen et al. |
| 10,966,837 B2 | 4/2021 | McMinn |
| 11,096,798 B2 | 8/2021 | Allen et al. |
| 11,589,993 B2 | 2/2023 | Lerf et al. |
| 11,957,590 B2 | 4/2024 | Gugler et al. |
| 2009/0192610 A1 * | 7/2009 | Case ................ B29C 45/14 |
| | | 623/22.21 |
| 2011/0166664 A1 | 7/2011 | DelFosse et al. |
| 2012/0071986 A1 * | 3/2012 | Anitua Aldecoa ...... A61L 31/16 |
| | | 427/2.26 |
| 2012/0139142 A1 | 6/2012 | Van Der Zel |
| 2013/0177467 A1 | 7/2013 | Gupta |
| 2021/0145604 A1 | 5/2021 | Allen et al. |
| 2021/0145605 A1 | 5/2021 | Allen et al. |
| 2024/0197483 A1 | 6/2024 | Gugler et al. |

FOREIGN PATENT DOCUMENTS

| | | | | |
|---|---|---|---|---|
| WO | WO-2015095790 A1 * | 6/2015 | ............. | A61L 27/50 |
| WO | WO-2021030350 A1 * | 2/2021 | ............... | C08K 5/13 |
| WO | WO-2021239932 A1 * | 12/2021 | ......... | A61F 2/30756 |

OTHER PUBLICATIONS

"RM Pressfit: Pioneering, proven & isoelastic" Product Information, Matthys, a company of enovis, Item No. 336.010.121; Jan. 2023.

* cited by examiner

PROSTHETIC DEVICE

CROSS-REFERENCE

This application is a continuation-in-part of commonly-owned, co-pending U.S. patent application Ser. No. 18/956,308, filed on Nov. 22, 2024 and entitled "METHOD FOR MAKING PROSTHETIC DEVICE," the contents of which are incorporated herein by reference in their entirety.

FIELD

This disclosure relates generally to an implantable prosthetic device. More particularly, this disclosure relates to a prosthetic device that includes a biocompatible metal coated onto a polymeric material.

BACKGROUND

Joint prosthetics for implantation in the human body often include a portion that is configured to be secured to the body in order to retain the prosthetic in its desired location, as well as a portion that acts as an articular surface within the joint. In some cases, the two portions are made from different materials that are suited to these functions. In such cases, the two materials should adhere securely to one another for the prosthetic to be structurally sound and durable once implanted in the body.

SUMMARY

In some embodiments, a device includes a prosthesis core and a coating layer, wherein the prosthesis core is a cup-shaped core having a first side and a second side, wherein the first side is concave, and wherein the second side is convex, wherein the prosthesis core includes ultra-high molecular weight polyethylene, wherein the ultra-high molecular weight polyethylene has a weight average molecular weight that is in a range of from $2\times10^6$ grams per mole to $3\times10^6$ grams per mole, and wherein, when tested for tensile strength in accordance with ASTM D638-22, the prosthesis core has a tensile strength that is in a range of from 35 MPa to 50 MPa; and wherein the coating layer coats the second side of the prosthesis core, wherein the coating layer includes titanium powder, wherein the titanium powder has a D50 particle size that is in a range of from 200 microns to 250 microns, wherein the coating layer has a mean thickness that is in a range of from 200 to 500 microns, wherein the device is an acetabular cup prosthesis, wherein, when tested for abrasion resistance in accordance with ASTM F1978-22, the coating layer loses less than 65 milligrams when abraded for 100 cycles, wherein, when tested for static shear bond strength in accordance with a static shear bond strength test, the coating layer has a static shear bond strength that is in a range of from 15 MPa to 25 MPa, and wherein, when tested for static tensile bond strength in accordance with a static tensile bond strength test, the coating layer has a static tensile bond strength that is in a range of from 14 MPa to 25 MPa.

In some embodiments, the ultra-high molecular weight polyethylene is vitamin E enriched. In some embodiments, the ultra-high molecular weight polyethylene has a vitamin E concentration that is in a range of 1,000 parts per million to 5,000 parts per million.

In some embodiments, the first side of the prosthesis core is sized to articulate with a patient's native femoral head.

In some embodiments, the first side of the prosthesis core is sized to articulate with a prosthetic femoral head.

In some embodiments, the coating layer has a mean arithmetic average surface roughness Ra that is in a range of from 35 microns to 45 microns.

In some embodiments, when tested for small punch strength in accordance with a small punch test, the prosthesis core has a peak load that is in a range of from 70 Newtons to 80 Newtons.

In some embodiments, when tested for fatigue crack propagation in accordance with a fatigue crack propagation test, the prosthesis core has a Paris exponent m that is in a range of from 6 to 7 and a Paris coefficient C that is in a range of from $8\times10^6$ to $11.5\times10^{-6}$.

In some embodiments, when tested for compressive modulus in accordance with ASTM D695-15, the prosthesis core has a compressive modulus that is in a range of from 0.8 GPa to 1.2 GPa.

In some embodiments, when tested for oxidation index in accordance with an oxidation test, the first side of the prosthesis core has an oxidation index that is in a range of from 0.06 to 0.1.

In some embodiments, when tested for trans-vinylene index in accordance with a trans-vinylene index test, the prosthesis core has a trans-vinylene index that is in a range of from 0.025 to 0.045.

In some embodiments, when tested for crystallinity in accordance with a differential scanning calorimetry crystallinity test, the prosthesis core has a crystallinity percentage that is in a range of from 55% to 70%.

In some embodiments, when tested for impact strength in accordance with an Izod impact strength test, the prosthesis core has an impact strength that is in a range of from 65 $kJ/m^2$ to 75 $kJ/m^2$.

In some embodiments, when tested for crosslink density in accordance with a crosslink density test, the prosthesis core has a crosslink density that is in a range of from 0.15 $mol/dm^3$ to 0.2 $mol/dm^3$.

BRIEF DESCRIPTION OF THE DRAWINGS

References are made to the accompanying drawings that form a part of this disclosure and that illustrate embodiments in which the systems and methods described in this Specification can be practiced.

Like reference numbers represent the same or similar parts throughout.

DETAILED DESCRIPTION

Figure 1:
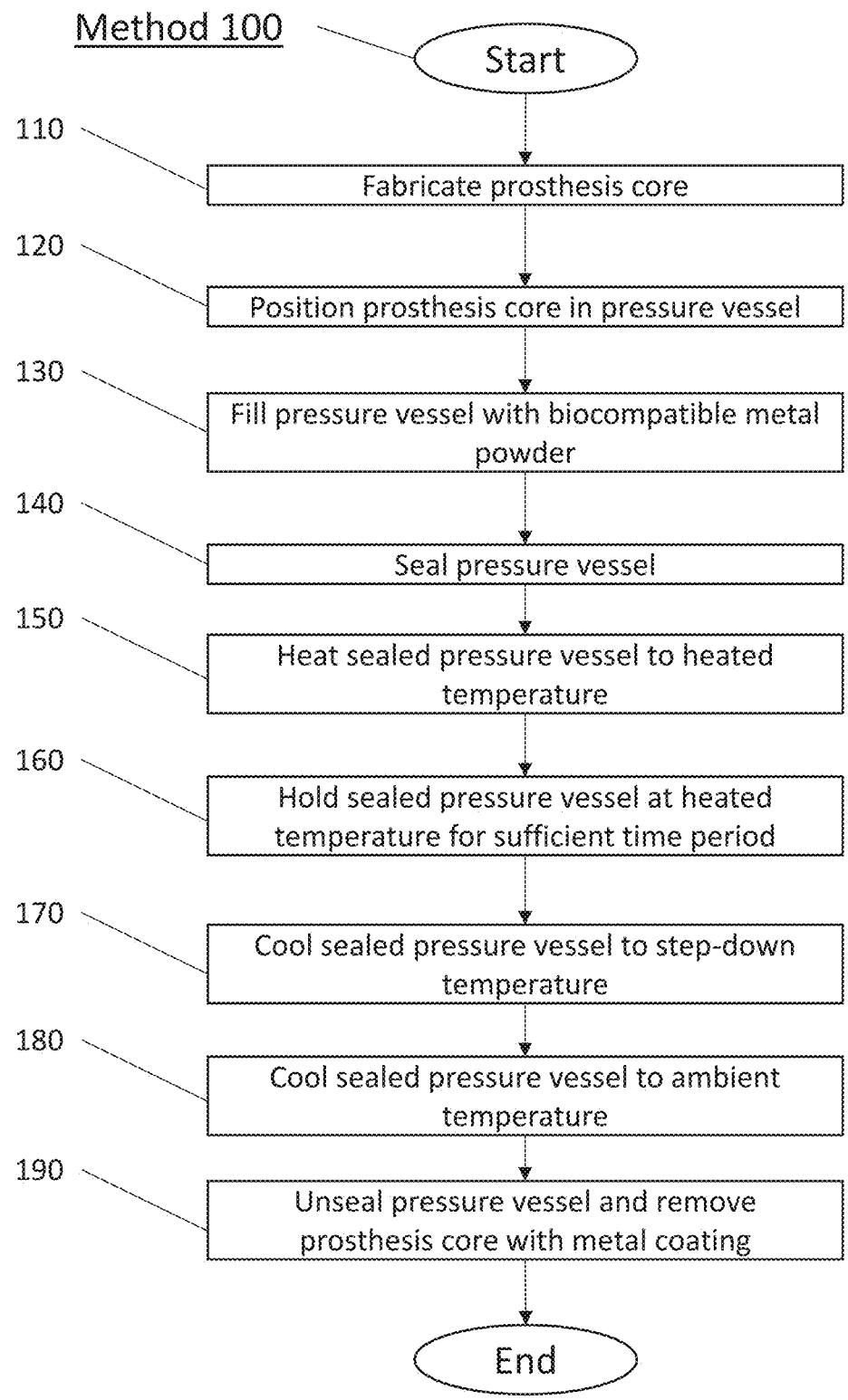
FIG. 1 shows a flowchart of an exemplary process for making a prosthetic device in accordance with some embodiments of the invention.

Embodiments of joint prosthetics for implantation in the human body include a portion that is configured to be secured to the body in order to retain the prosthetic in its desired location, as well as a portion that acts as an articular surface within the joint. In some embodiments, the two portions are made from different materials that are suited to these functions. In some embodiments as described herein, the two materials adhere securely to one another, thereby enabling the prosthetic to be structurally sound and durable once implanted in the body.

In some embodiments, a prosthetic device made in accordance with the exemplary methods described herein includes an articular portion that includes a polymeric material. In some embodiments, as described herein, the articular portion can be referred to as a "core" and the polymeric material can be referred to as a "core material." In some embodiments, the polymeric material includes polyethylene ("PE"), such as ultrahigh molecular weight polyethylene ("UHMWPE"). In some embodiments, the polymeric material includes a polyaryl ether ketone ("PAEK"), such as polyether ether ketone ("PEEK"), polyether ketone ketone ("PEKK"), poly (aryl-ether-ketone-ether-ketoneketone) ("PEKEKK"), or carbon fiber reinforced polyether ether ketone ("CFR-PEEK"). In some embodiments, the polymeric material includes a combination of more than one of the materials listed.

In some embodiments, the polymeric material has a molecular weight that is in a range of from $2 \times 10^6$ grams per mole to $1 \times 10^7$ grams per mole, or from $2 \times 10^6$ grams per mole to $9 \times 10^6$ grams per mole, or from $2 \times 10^6$ grams per mole to $8 \times 10^6$ grams per mole, or from $2 \times 10^6$ grams per mole to $7 \times 10^6$ grams per mole, or from $2 \times 10^6$ grams per mole to $6 \times 10^6$ grams per mole, or from $2 \times 10^6$ grams per mole to $5 \times 10^6$ grams per mole, or from $2 \times 10^6$ grams per mole to $4 \times 10^6$ grams per mole, or from $2 \times 10^6$ grams per mole to $3 \times 10^6$ grams per mole, or from $2 \times 10^6$ grams per mole to $2.25 \times 10^6$ grams per mole, or from $2 \times 10^6$ grams per mole to $2.5 \times 10^6$ grams per mole, or from $2 \times 10^6$ grams per mole to $2.75 \times 10^6$ grams per mole, or from $2.25 \times 10^6$ grams per mole to $3 \times 10^6$ grams per mole, or from $2.25 \times 10^6$ grams per mole to $2.75 \times 10^6$ grams per mole, or from $2.25 \times 10^6$ grams per mole to $2.5 \times 10^6$ grams per mole, or from $2.5 \times 10^6$ grams per mole to $3 \times 10^6$ grams per mole, or from $2.5 \times 10^6$ grams per mole to $2.75 \times 10^6$ grams per mole, or from $2.75 \times 10^6$ grams per mole to $3 \times 10^6$ grams per mole.

In some embodiments, the polymeric material includes ultra high molecular weight polyethylene ("UHMWPE") having a molecular weight that is in a range of from $1 \times 10^6$ grams per mole to $1 \times 10^7$ grams per mole, or from $1 \times 10^6$ grams per mole to $9 \times 10^6$ grams per mole, or from $1 \times 10^6$ grams per mole to $8 \times 10^6$ grams per mole, or from $1 \times 10^6$ grams per mole to $7.5 \times 10^6$ grams per mole, or from $1 \times 10^6$ grams per mole to $7 \times 10^6$ grams per mole, or from $1 \times 10^6$ grams per mole to $6 \times 10^6$ grams per mole, or from $1 \times 10^6$ grams per mole to $5 \times 10^6$ grams per mole, or from $1 \times 10^6$ grams per mole to $4 \times 10^6$ grams per mole, or from $1 \times 10^6$ grams per mole to $3 \times 10^6$ grams per mole, or from $1 \times 10^6$ grams per mole to $2.25 \times 10^6$ grams per mole, or from $1 \times 10^6$ grams per mole to $2.5 \times 10^6$ grams per mole, or from $1 \times 10^6$ grams per mole to $2.75 \times 10^6$ grams per mole, or from $2 \times 10^6$ grams per mole to $9 \times 10^6$ grams per mole, or from $2 \times 10^6$ grams per mole to $8 \times 10^6$ grams per mole, or from $2 \times 10^6$ grams per mole to $7.5 \times 10^6$ grams per mole, or from $2 \times 10^6$ grams per mole to $7 \times 10^6$ grams per mole, or from $2 \times 10^6$ grams per mole to $6 \times 10^6$ grams per mole, or from $2 \times 10^6$ grams per mole to $5 \times 10^6$ grams per mole, or from $2 \times 10^6$ grams per mole to $4 \times 10^6$ grams per mole, or from $2 \times 10^6$ grams per mole to $3 \times 10^6$ grams per mole, or from $2 \times 10^6$ grams per mole to $2.25 \times 10^6$ grams per mole, or from $2 \times 10^6$ grams per mole to $2.5 \times 10^6$ grams per mole, or from $2 \times 10^6$ grams per mole to $2.75 \times 10^6$ grams per mole, or from $2.25 \times 10^6$ grams per mole to $3 \times 10^6$ grams per mole, or from $2.25 \times 10^6$ grams per mole to $2.75 \times 10^6$ grams per mole, or from $2.25 \times 10^6$ grams per mole to $2.5 \times 10^6$ grams per mole, or from $2.5 \times 10^6$ grams per mole to $3 \times 10^6$ grams per mole, or from $2.5 \times 10^6$ grams per mole to $2.75 \times 10^6$ grams per mole, or from $2.75 \times 10^6$ grams per mole to $3 \times 10^6$ grams per mole.

In some embodiments, the polymeric material includes a polyaryl ether ketone ("PAEK") having a molecular weight that is in a range of from $8 \times 10^4$ grams per mole to $1.2 \times 10^5$ grams per mole, or from $9 \times 10^4$ grams per mole to $1.2 \times 10^5$ grams per mole, or from $1 \times 10^5$ grams per mole to $1.2 \times 10^5$ grams per mole, or from $1.1 \times 10^5$ grams per mole to $1.2 \times 10^5$ grams per mole, or from $8 \times 10^4$ grams per mole to $1.1 \times 10^5$ grams per mole, or from $9 \times 10^4$ grams per mole to $1.1 \times 10^5$ grams per mole, or from $1 \times 10^5$ grams per mole to $1.1 \times 10^5$ grams per mole, or from $8 \times 10^4$ grams per mole to $1 \times 10^5$ grams per mole, or from $9 \times 10^4$ grams per mole to $1 \times 10^5$ grams per mole, or from $8 \times 10^4$ grams per mole to $9 \times 10^4$ grams per mole.

In some embodiments, the polymeric material is vitamin E-enriched (e.g., is vitamin E-enriched UHMWPE having a molecular weight that is in a range of from $2 \times 10^6$ grams per mole to $3 \times 10^6$ grams per mole). In some embodiments, the polymeric material is a vitamin-E enriched polymer having a vitamin E concentration that is in a range of from 500 parts per million ("ppm") to 5,000 ppm, or from 1,000 ppm to 5,000 ppm, or from 2,000 ppm to 5,000 ppm, or from 3,000 ppm to 5,000 ppm, or from 4,000 ppm to 5,000 ppm, or from 500 ppm to 4,000 ppm, or from 1,000 ppm to 4,000 ppm, or from 2,000 ppm to 4,000 ppm, or from 3,000 ppm to 4,000 ppm, or from 500 ppm to 3,000 ppm, or from 1,000 ppm to 3,000 ppm, or from 2,000 ppm to 3,000 ppm, or from 500 ppm to 2,000 ppm, or from 1,000 ppm to 2,000 ppm, or from 500 ppm to 1,000 ppm. In some embodiments, the polymeric material includes one of the materials commercialized under the trade name GUR by Celanese Corporation of Irving, Texas, such as one of the material commercialized under the trade names GUR 1020 or GUR 1050.

In some embodiments, a prosthetic device made in accordance with the exemplary methods described herein includes a portion that is made from a biocompatible metal. In some embodiments, the biocompatible metal is a biocompatible metal powder. In some embodiments, the biocompatible metal powder includes titanium. In some embodiments, the biocompatible metal powder includes surgical grade titanium powder that meets the purity standards set out in ASTM F1580-18. In some embodiments, the biocompatible metal powder has a D50 particle size that is in a range of from 75 to 300 microns, or is in a range of from 100 to 300 microns, or is in a range of from 150 to 300 microns, or is in a range of from 200 to 300 microns, or is in a range of from 250 to 300 microns, or is in a range of from 75 to 250 microns, or is in a range of from 100 to 250 microns, or is in a range of from 150 to 250 microns, or is in a range of from 200 to 250 microns, or is in a range of from 75 to 200 microns, or is in a range of from 100 to 200 microns, or is in a range of from 150 to 200 microns, or is in a range of from 75 to 150 microns, or is in a range of from 100 to 150 microns.

Exemplary methods are described herein with reference to certain apparatuses that are utilized to perform the exemplary methods. The specific apparatuses that are described herein should be understood to be illustrative rather than limiting, and the principles embodied by the exemplary methods can also be practiced through the use of other apparatuses not specifically described herein.

Exemplary methods will be described herein with specific reference to a hip resurfacing prosthesis, which is a prosthesis that is implanted in the pelvis in place of a patient's native acetabulum, and which articulates with a patient's native femoral head (e.g., the native contact surface of the patient's native femoral head or a resurfacing prosthesis that is applied to the native femoral head). In other embodiments, the exemplary methods may be adapted to make other types of prosthetics, including, but not limited to, an acetabular side of a total hip replacement prosthesis, a portion of a shoulder prosthesis (e.g., a glenoid implant of a shoulder prosthesis), a portion of a knee prosthesis (e.g., a tibial implant of a knee prosthesis), a portion of an ankle prosthesis (e.g., a tibial implant of an ankle prosthesis), or a portion of a toe joint prosthesis (e.g., a metatarsal implant of a toe joint prosthesis, such as a hallux rigidus prosthesis).

Figure 2A:
FIG. 2A shows a top perspective view of an exemplary prosthesis core in accordance with some embodiments of the invention.
Figure 2B:
FIG. 2B shows a bottom perspective view of the exemplary prosthesis core shown in FIG. 2A in accordance with some embodiments of the invention.
Figure 2C:
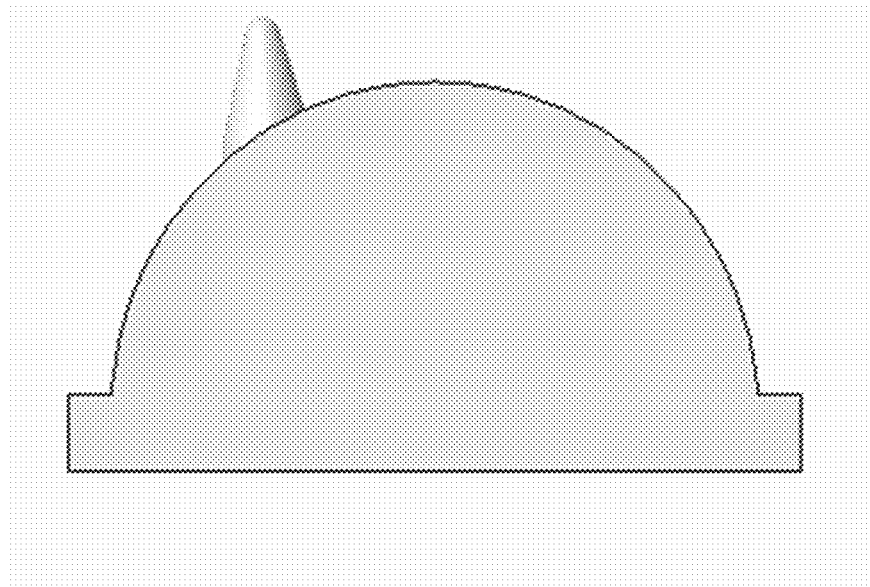
FIG. 2C shows a side view of the exemplary prosthesis core shown in FIG. 2A in accordance with some embodiments of the invention.
Figure 2D:
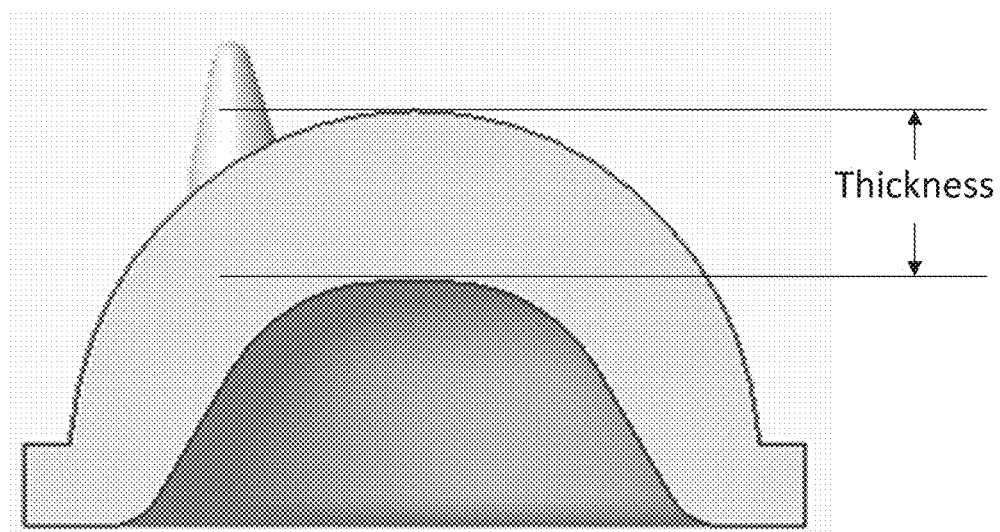
FIG. 2D shows a section view of the exemplary prosthesis core shown in FIG. 2A in accordance with some embodiments of the invention.

FIG. 1 shows a flowchart of an exemplary method 100 for making a prosthetic device by applying a coating to a prosthesis core in accordance with some embodiments of the invention. FIGS. 2A-6 show elements of the prosthetic device and the apparatus for making the same at various stages of the method 100 in accordance with some embodiments of the invention. In step 110, a prosthesis core is formed from a core material. As described above, in some embodiments, the core material is a polymeric material, such as vitamin E-enriched UHMWPE. In some embodiments, the prosthesis core is molded, additively manufactured, machined, or otherwise formed from the core material. FIGS. 2A, 2B, 2C, and 2D show a top perspective view, a bottom perspective view, a side view, and a side section view, respectively, of an exemplary prosthesis core. In some embodiments, the prosthesis core has a thickness (e.g., as measured from an inner surface to an outer surface at the center of the prosthesis core, as shown in FIG. 2D) that is in a range of from 5 millimeters (e.g., for a small size prosthesis) to 9 millimeters (e.g., for a large size prosthesis).

Figure 3:
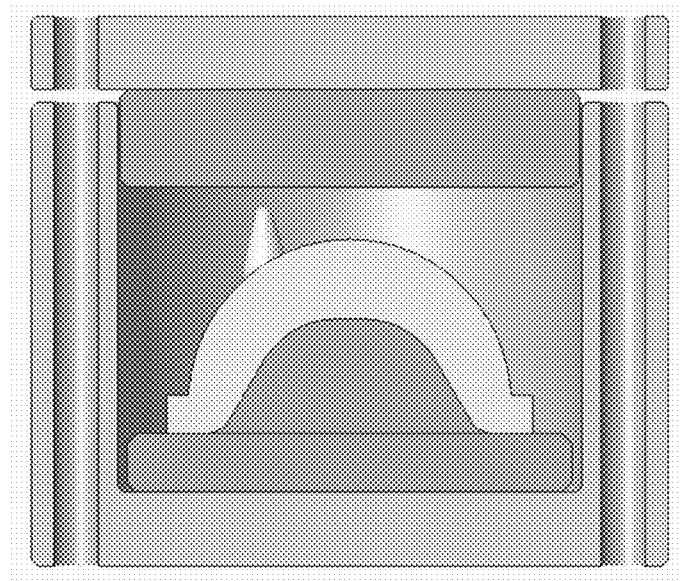
FIG. 3 shows an exemplary prosthesis core as positioned on an exemplary tool within an exemplary pressure vessel in accordance with some embodiments of the invention.

In step 120, the prosthesis core is positioned within a pressure vessel. In some embodiments, the prosthesis core is placed on a tool that is positioned within the pressure vessel. In some embodiments, the tool is sized and shaped to conform to the surface contours of a portion of the prosthesis core. In some embodiments, a contact area between the tool and the prosthesis core defines a portion of the prosthesis core that will remain uncoated during performance of the method 100. For example, in some embodiments, the contact area defines an uncoated portion that is sized and shaped to form an articular surface of an acetabular cup prosthesis. In some embodiments, the pressure vessel includes a base (e.g., an interior bottom surface) upon which the tool is placed. In some embodiments, a non-stick liner is positioned on the tool prior to the prosthesis core to prevent the prosthesis core from sticking to the tool. In some embodiments, the prosthesis core as positioned within the pressure vessel defines a prosthesis core height, which is the distance between the base and the portion of the prosthesis core that is furthest from the base as measured perpendicular to the base. FIG. 3 shows a cross-sectional view of an exemplary prosthesis core positioned on an exemplary tool and within an exemplary pressure vessel in accordance with some embodiments of the invention.

In step 130, the pressure vessel, with the tool and prosthesis core therein, is filled with a biocompatible metal powder. In some embodiments, the biocompatible metal powder includes any of the biocompatible metal powders described above. In some embodiments, the biocompatible metal powder is titanium powder having a D50 particle size of 225 microns. In some embodiments, the pressure vessel is filled with a sufficient amount of the biocompatible metal powder so as to fully cover the tool and the prosthesis core, while not being an amount that is excessive such that the biocompatible metal powder interferes with proper sealing of the pressure vessel. In some embodiments, the sufficient amount is an amount that fills the pressure vessel to a height that is at least 110% of the prosthesis core height, where the height to which the biocompatible metal powder fills the pressure vessel is measured from the base and in a direction perpendicular to the base in the same manner as the prosthesis core height.

Figure 4:
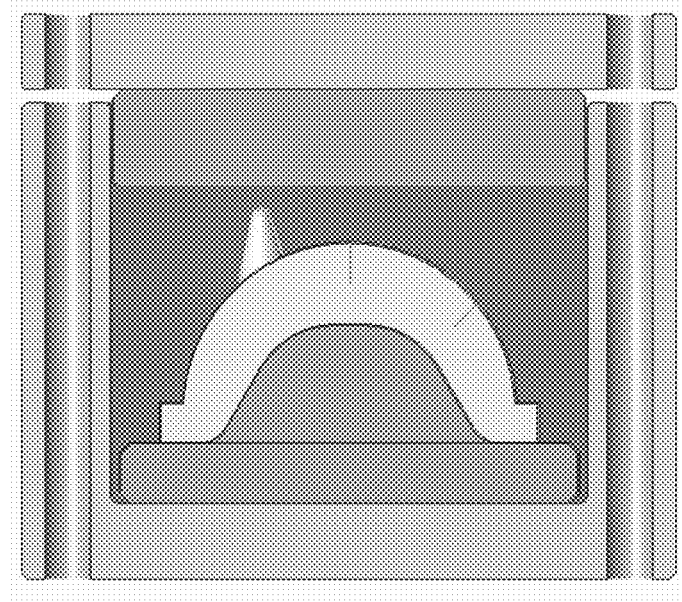
FIG. 4 shows an exemplary prosthesis core as positioned on an exemplary tool within an exemplary pressure vessel, the pressure vessel having been filled with a biocompatible metal powder and sealed, in accordance with some embodiments of the invention.

In step 140, the pressure vessel is sealed. In some embodiments, sealing the pressure vessel includes positioning a pressure plate of the pressure vessel so as to contact the biocompatible metal powder and thereby press down the biocompatible metal powder such that substantially no head space remains between the pressure plate and the biocompatible metal powder. In some embodiments, the sealing is hermetic sealing (e.g., such that gases cannot enter or exit the pressure vessel by flowing into or out of the region enclosed by the pressure vessel and the pressure plate). In some embodiments, the sealing is not hermetic (e.g., non-hermetic) sealing (e.g., such that gases can enter and exit the pressure vessel by flowing into or out of the region enclosed by the pressure vessel and the pressure plate. FIG. 4 shows a cross-sectional view of an exemplary pressure vessel containing an exemplary prosthesis core positioned on an exemplary tool, filled with a biocompatible metal powder and sealed as described above, in accordance with some embodiments of the invention.

In step 150, the sealed pressure vessel is heated to a heated temperature. In some embodiments, the heated temperature is a temperature that is sufficiently high to cause the prosthesis core to soften, but not so high as to cause the prosthesis core to lose its overall shape or to cause the biocompatible metal powder to soften. In some embodiments, the heated temperature varies depending on the specific polymer that forms the prosthesis core.

In some embodiments, the heated temperature is in a range of from 150 degrees Celsius to 200 degrees Celsius. In some embodiments, the heated temperature is in a range of from 150 degrees Celsius to 190 degrees Celsius. In some embodiments, the heated temperature is in a range of from 150 degrees Celsius to 180 degrees Celsius. In some embodiments, the heated temperature is in a range of from 150 degrees Celsius to 170 degrees Celsius. In some embodiments, the heated temperature is in a range of from 150 degrees Celsius to 160 degrees Celsius. In some embodiments, the heated temperature is in a range of from 160 degrees Celsius to 200 degrees Celsius. In some embodiments, the heated temperature is in a range of from 160 degrees Celsius to 190 degrees Celsius. In some embodiments, the heated temperature is in a range of from 160 degrees Celsius to 180 degrees Celsius. In some embodiments, the heated temperature is in a range of from 160 degrees Celsius to 170 degrees Celsius. In some embodiments, the heated temperature is in a range of from 170 degrees Celsius to 200 degrees Celsius. In some embodiments, the heated temperature is in a range of from 170 degrees Celsius to 190 degrees Celsius. In some embodiments, the heated temperature is in a range of from 170 degrees Celsius to 180 degrees Celsius. In some embodiments, the heated temperature is in a range of from 180 degrees Celsius to 200 degrees Celsius. In some embodiments, the heated temperature is in a range of from 180 degrees Celsius to 190 degrees Celsius. In some embodiments, the heated temperature is in a range of from 190 degrees Celsius to 200 degrees Celsius.

In some embodiments, the heated temperature is in a range of from 130 degrees Celsius to 450 degrees Celsius, or is in a range of from 170 degrees Celsius to 450 degrees Celsius, or is in a range of from 210 degrees Celsius to 450 degrees Celsius, or is in a range of from 250 degrees Celsius to 450 degrees Celsius, or is in a range of from 290 degrees Celsius to 450 degrees Celsius, or is in a range of from 330 degrees Celsius to 450 degrees Celsius, or is in a range of from 370 degrees Celsius to 450 degrees Celsius, or is in a range of from 410 degrees Celsius to 450 degrees Celsius, or is in a range of from 130 degrees Celsius to 410 degrees Celsius, or is in a range of from 170 degrees Celsius to 410 degrees Celsius, or is in a range of from 210 degrees Celsius to 410 degrees Celsius, or is in a range of from 250 degrees Celsius to 410 degrees Celsius, or is in a range of from 290 degrees Celsius to 410 degrees Celsius, or is in a range of from 330 degrees Celsius to 410 degrees Celsius, or is in a range of from 370 degrees Celsius to 410 degrees Celsius, or is in a range of from 130 degrees Celsius to 370 degrees Celsius, or is in a range of from 170 degrees Celsius to 370 degrees Celsius, or is in a range of from 210 degrees Celsius to 370 degrees Celsius, or is in a range of from 250 degrees Celsius to 370 degrees Celsius, or is in a range of from 290 degrees Celsius to 370 degrees Celsius, or is in a range of from 330 degrees Celsius to 370 degrees Celsius, or is in a range of from 130 degrees Celsius to 330 degrees Celsius, or is in a range of from 170 degrees Celsius to 330 degrees Celsius, or is in a range of from 210 degrees Celsius to 330 degrees Celsius, or is in a range of from 250 degrees Celsius to 330 degrees Celsius, or is in a range of from 290 degrees Celsius to 330 degrees Celsius, or is in a range of from 130 degrees Celsius to 290 degrees Celsius, or is in a range of from 170 degrees Celsius to 290 degrees Celsius, or is in a range of from 210 degrees Celsius to 290 degrees Celsius, or is in a range of from 250 degrees Celsius to 290 degrees Celsius, or is in a range of from 130 degrees Celsius to 250 degrees Celsius, or is in a range of from 170 degrees Celsius to 250 degrees Celsius, or is in a range of from 210 degrees Celsius to 250 degrees Celsius, or is in a range of from 130 degrees Celsius to 210 degrees Celsius, or is in a range of from 170 degrees Celsius to 210 degrees Celsius, or is in a range of from 130 degrees Celsius to 170 degrees Celsius.

In some embodiments, the polymeric material is UHMWPE, and the heated temperature is in a range of from 137 degrees Celsius to 200 degrees Celsius, or is in a range of from 137 degrees Celsius to 190 degrees Celsius, or is in a range of from 137 degrees Celsius to 180 degrees Celsius, or is in a range of from 137 degrees Celsius to 170 degrees Celsius, or is in a range of from 137 degrees Celsius to 160 degrees Celsius, or is in a range of from 137 degrees Celsius to 150 degrees Celsius, or is in a range of from 137 degrees Celsius to 145 degrees Celsius, or is in a range of from 150 degrees Celsius to 200 degrees Celsius, or is in a range of from 150 degrees Celsius to 190 degrees Celsius, or is in a range of from 150 degrees Celsius to 180 degrees Celsius, or is in a range of from 150 degrees Celsius to 170 degrees Celsius, or is in a range of from 150 degrees Celsius to 160 degrees Celsius, or is in a range of from 160 degrees Celsius to 200 degrees Celsius, or is in a range of from 160 degrees Celsius to 190 degrees Celsius, or is in a range of from 160 degrees Celsius to 180 degrees Celsius, or is in a range of from 160 degrees Celsius to 170 degrees Celsius, or is in a range of from 170 degrees Celsius to 200 degrees Celsius, or is in a range of from 170 degrees Celsius to 190 degrees Celsius, or is in a range of from 170 degrees Celsius to 180 degrees Celsius, or is in a range of from 180 degrees Celsius to 200 degrees Celsius, or is in a range of from 180 degrees Celsius to 190 degrees Celsius, or is in a range of from 190 degrees Celsius to 200 degrees Celsius.

In some embodiments, the polymeric material is a PAEK, and the heated temperature is in a range of from 340 degrees Celsius to 450 degrees Celsius, or from 362 degrees Celsius to 450 degrees Celsius, or from 384 degrees Celsius to 450 degrees Celsius, or from 406 degrees Celsius to 450 degrees Celsius, or from 428 degrees Celsius to 450 degrees Celsius, or from 340 degrees Celsius to 428 degrees Celsius, or from 362 degrees Celsius to 428 degrees Celsius, or from 384 degrees Celsius to 428 degrees Celsius, or from 406 degrees Celsius to 428 degrees Celsius, or from 340 degrees Celsius to 406 degrees Celsius, or from 362 degrees Celsius to 406 degrees Celsius, or from 384 degrees Celsius to 406 degrees Celsius, from 340 degrees Celsius to 384 degrees Celsius, or from 362 degrees Celsius to 384 degrees Celsius, or from 340 degrees Celsius to 384 degrees Celsius.

In some embodiments, the heating step includes placing the pressure vessel in a preheated environment (e.g., a preheated oven) that is preheated to the heated temperature before placement of the sealed pressure vessel. In some embodiments, the heating step includes gradually heating an environment in which the sealed pressure vessel is positioned from a lower temperature to the preheated temperature. For example, in some embodiments, the heating step includes placing the sealed pressure vessel in an environment that is at a lower temperature than the preheated temperature (e.g., is at room temperature, or is at an intermediate temperature that is between room temperature than the preheated temperature) and heating the environment from the lower temperature to the heated temperature. In some embodiments, the heating step includes applying to the pressure vessel a heating device (e.g., a heating jacket) that is at a lower temperature than the preheated temperature (e.g., is at room temperature, or is at an intermediate temperature that is between room temperature than the preheated temperature) and heating the heating device from the lower temperature to the heated temperature to thereby heat the pressure vessel to the heated temperature.

In some embodiments, during the heating step, the contents of the pressure vessel (e.g., the prosthesis core and the biocompatible metal powder) are heated to the heated temperature in accordance with a controlled heating profile. In some embodiments, the controlled heating profile includes heating the environment at a controlled heating rate. In some embodiments in which the heating step includes placing the pressure vessel in a preheated environment that is preheated to the heated temperature, the contents of the pressure vessel gradually rise from an original temperature (e.g., room temperature) to the heated temperature at the controlled heating rate based on factors such as the thermal mass of the items being heated. In some embodiments in which the heating step includes gradually heating an environment in which the sealed pressure vessel is positioned from a lower temperature (e.g., room temperature) to the preheated temperature, the environment is heated at the controlled heating rate to thereby heat the sealed pressure vessel and the contents thereof at the controlled heating rate.

In some embodiments, the controlled heating rate is in a range of from 0.01 degrees Celsius per hour to 50 degrees Celsius per hour. In some embodiments, the controlled heating rate is in a range of from 0.01 degrees Celsius per hour to 40 degrees Celsius per hour. In some embodiments, the controlled heating rate is in a range of from 0.01 degrees Celsius per hour to 30 degrees Celsius per hour. In some embodiments, the controlled heating rate is in a range of from 0.01 degrees Celsius per hour to 20 degrees Celsius per hour. In some embodiments, the controlled heating rate is in a range of from 0.01 degrees Celsius per hour to 10 degrees Celsius per hour. In some embodiments, the controlled heating rate is in a range of from 10 degrees Celsius per hour to 50 degrees Celsius per hour. In some embodiments, the controlled heating rate is in a range of from 10 degrees Celsius per hour to 40 degrees Celsius per hour. In some embodiments, the controlled heating rate is in a range of from 10 degrees Celsius per hour to 30 degrees Celsius per hour. In some embodiments, the controlled heating rate is in a range of from 10 degrees Celsius per hour to 20 degrees Celsius per hour. In some embodiments, the controlled heating rate is in a range of from 20 degrees Celsius per hour to 50 degrees Celsius per hour. In some embodiments, the controlled heating rate is in a range of from 20 degrees Celsius per hour to 40 degrees Celsius per hour. In some embodiments, the controlled heating rate is in a range of from 20 degrees Celsius per hour to 30 degrees Celsius per hour. In some embodiments, the controlled heating rate is in a range of from 30 degrees Celsius per hour to 50 degrees Celsius per hour. In some embodiments, the controlled heating rate is in a range of from 30 degrees Celsius per hour to 40 degrees Celsius per hour. In some embodiments, the controlled heating rate is in a range of from 40 degrees Celsius per hour to 50 degrees Celsius per hour.

In some embodiments, the controlled heating rate is in a range of from 0.01 degrees Celsius per hour to 3,000 degrees Celsius per hour (i.e., 50 degrees Celsius per minute), or is in a range of from 50 degrees Celsius per hour to 3,000 degrees Celsius per hour, or is in a range of from 250 degrees Celsius per hour to 3,000 degrees Celsius per hour, or is in a range of from 500 degrees Celsius per hour to 3,000 degrees Celsius per hour, or is in a range of from 1,000 degrees Celsius per hour to 3,000 degrees Celsius per hour, or is in a range of from 2,000 degrees Celsius per hour to 3,000 degrees Celsius per hour, or is in a range of from 0.01 degrees Celsius per hour to 2,000 degrees Celsius per hour, or is in a range of from 50 degrees Celsius per hour to 2,000 degrees Celsius per hour, or is in a range of from 250 degrees Celsius per hour to 2,000 degrees Celsius per hour, or is in a range of from 500 degrees Celsius per hour to 2,000 degrees Celsius per hour, or is in a range of from 1,000 degrees Celsius per hour to 2,000 degrees Celsius per hour, or is in a range of from 0.01 degrees Celsius per hour to 1,000 degrees Celsius per hour, or is in a range of from 50 degrees Celsius per hour to 1,000 degrees Celsius per hour, or is in a range of from 250 degrees Celsius per hour to 1,000 degrees Celsius per hour, or is in a range of from 500 degrees Celsius per hour to 1,000 degrees Celsius per hour, or is in a range of from 0.01 degrees Celsius per hour to 500 degrees Celsius per hour, or is in a range of from 50 degrees Celsius per hour to 50 degrees Celsius per hour, or is in a range of from 250 degrees Celsius per hour to 500 degrees Celsius per hour, or is in a range of from 0.01 degrees Celsius per hour to 250 degrees Celsius per hour, or is in a range of from 50 degrees Celsius per hour to 250 degrees Celsius per hour, or is in a range of from 0.01 degrees Celsius per hour to 100 degrees Celsius per hour.

In step 160, the sealed pressure vessel is held at the heated temperature for a sufficient time period to adhere the biocompatible metal powder to the prosthesis core in a manner as will be described herein. In some embodiments, the sufficient time period is a predetermined time period. In some embodiments, the predetermined time period is a time period that is in a range of from 10 minutes to 600 minutes. In some embodiments, during step 160, the application of heat causes the prosthesis core both to soften and expand. In some embodiments, expansion of the prosthesis core, together with buildup of pressure within the pressure vessel in embodiments in which the pressure vessel is hermetically sealed, causes an increase pressure within the pressure vessel. In some embodiments, the pressure within the pressure vessel during step 160 is in a range of from 10 MPa to 50 MPa. In some embodiments, while the pressure vessel is held at the heated temperature and pressure builds within the pressure vessel, the titanium powder acts as a working fluid within the pressure vessel.

In some embodiments, during the sufficient time period during which the sealed pressure vessel is being held at the heated temperature, the prosthesis core softens and expands. As a result of the softening and expansion, together with the lack of head space surrounding the biocompatible metal powder and the incompressibility of the biocompatible metal powder, the prosthesis core expands into the gaps that are present between the surrounding particles of the biocompatible metal powder, thereby forcing a layer of the surrounding particles into the exterior of the prosthesis core and forming a coating. In some embodiments, the coating is formed on the entire exterior surface of the prosthesis core other than the contact area between the tool and the prosthesis core, which remains uncoated. In some embodiments, because the heated temperature is not sufficiently high to cause softening of the biocompatible metal powder, the particles that form the coating do not join or adhere to one another or otherwise form a unitary whole, but, rather, remain as discrete particles that adhere to the prosthesis core independently of one another.

In step 170, the sealed pressure vessel is allowed to cool to a step-down temperature at a controlled cooling rate. In some embodiments, the step-down temperature is a temperature that is between the heated temperature and an ambient temperature. In some embodiments, the controlled cooling allows a suitable crystalline structure to be maintained in the polymeric material of the prosthesis core. In some embodiments in which the polymeric material of the prosthesis core is vitamin E enriched, the controlled cooling allows the vitamin E content to be maintained. In some embodiments, during the controlled cooling, the prosthesis core resolidifies after having softened while at the heated temperature. In some embodiments, as the prosthesis core resolidifies, the particles of the biocompatible metal powder that have adhered to the prosthesis core remain adhered as a coating, and remain discrete particles that do not adhere to one another. In some embodiments, at the same time, the particles of the biocompatible metal powder that have not adhered to the prosthesis core also do not adhere to one another, and remain in a free powder form that can be removed from the prosthesis core and coating. In some embodiments, the controlled cooling step includes a cooling phase that is performed while the pressure vessel is maintained in a controlled environment, such as within an oven.

In some embodiments, the step-down temperature is in a range that is between 20 degrees Celsius and 100 degrees Celsius. In some embodiments, the step-down temperature is in a range that is between 20 degrees Celsius and 90 degrees Celsius. In some embodiments, the step-down temperature is in a range that is between 20 degrees Celsius and 80 degrees Celsius. In some embodiments, the step-down temperature is in a range that is between 20 degrees Celsius and 70 degrees Celsius. In some embodiments, the step-down temperature is in a range that is between 20 degrees Celsius and 60 degrees Celsius. In some embodiments, the step-down temperature is in a range that is between 20 degrees Celsius and 50 degrees Celsius. In some embodiments, the step-down temperature is in a range that is between 20 degrees Celsius and 40 degrees Celsius. In some embodiments, the step-down temperature is in a range that is between 20 degrees Celsius and 30 degrees Celsius. In some embodiments, the step-down temperature is in a range that is between 30 degrees Celsius and 100 degrees Celsius. In some embodiments, the step-down temperature is in a range that is between 30 degrees Celsius and 90 degrees Celsius. In some embodiments, the step-down temperature is in a range that is between 30 degrees Celsius and 80 degrees Celsius. In some embodiments, the step-down temperature is in a range that is between 30 degrees Celsius and 70 degrees Celsius. In some embodiments, the step-down temperature is in a range that is between 30 degrees Celsius and 60 degrees Celsius. In some embodiments, the step-down temperature is in a range that is between 30 degrees Celsius and 50 degrees Celsius. In some embodiments, the step-down temperature is in a range that is between 30 degrees Celsius and 40 degrees Celsius. In some embodiments, the step-down temperature is in a range that is between 40 degrees Celsius and 100 degrees Celsius. In some embodiments, the step-down temperature is in a range that is between 40 degrees Celsius and 90 degrees Celsius. In some embodiments, the step-down temperature is in a range that is between 40 degrees Celsius and 80 degrees Celsius. In some embodiments, the step-down temperature is in a range that is between 40 degrees Celsius and 70 degrees Celsius. In some embodiments, the step-down temperature is in a range that is between 40 degrees Celsius and 60 degrees Celsius. In some embodiments, the step-down temperature is in a range that is between 40 degrees Celsius and 50 degrees Celsius.

In some embodiments, the step-down temperature is in a range that is between 50 degrees Celsius and 100 degrees Celsius. In some embodiments, the step-down temperature is in a range that is between 50 degrees Celsius and 90 degrees Celsius. In some embodiments, the step-down temperature is in a range that is between 50 degrees Celsius and 80 degrees Celsius. In some embodiments, the step-down temperature is in a range that is between 50 degrees Celsius and 70 degrees Celsius. In some embodiments, the step-down temperature is in a range that is between 50 degrees Celsius and 60 degrees Celsius. In some embodiments, the step-down temperature is in a range that is between 60 degrees Celsius and 100 degrees Celsius. In some embodiments, the step-down temperature is in a range that is between 60 degrees Celsius and 90 degrees Celsius. In some embodiments, the step-down temperature is in a range that is between 60 degrees Celsius and 80 degrees Celsius. In some embodiments, the step-down temperature is in a range that is between 60 degrees Celsius and 70 degrees Celsius. In some embodiments, the step-down temperature is in a range that is between 70 degrees Celsius and 100 degrees Celsius. In some embodiments, the step-down temperature is in a range that is between 70 degrees Celsius and 90 degrees Celsius. In some embodiments, the step-down temperature is in a range that is between 70 degrees Celsius and 80 degrees Celsius. In some embodiments, the step-down temperature is in a range that is between 80 degrees Celsius and 100 degrees Celsius. In some embodiments, the step-down temperature is in a range that is between 80 degrees Celsius and 90 degrees Celsius. In some embodiments, the step-down temperature is in a range that is between 90 degrees Celsius and 100 degrees Celsius.

In some embodiments, the step-down temperature is about 20 degrees Celsius, or about 21 degrees Celsius, or about 22 degrees Celsius, or about 23 degrees Celsius, or about 24 degrees Celsius, or about 25 degrees Celsius, or about 26 degrees Celsius, or about 27 degrees Celsius, or about 28 degrees Celsius, or about 29 degrees Celsius. In some embodiments, the step-down temperature is about 30 degrees Celsius, or about 31 degrees Celsius, or about 32 degrees Celsius, or about 33 degrees Celsius, or about 34 degrees Celsius, or about 35 degrees Celsius, or about 36 degrees Celsius, or about 37 degrees Celsius, or about 38 degrees Celsius, or about 39 degrees Celsius. In some embodiments, the step-down temperature is about 40 degrees Celsius, or about 41 degrees Celsius, or about 42 degrees Celsius, or about 43 degrees Celsius, or about 44 degrees Celsius, or about 45 degrees Celsius, or about 46 degrees Celsius, or about 47 degrees Celsius, or about 48 degrees Celsius, or about 49 degrees Celsius. In some embodiments, the step-down temperature is about 50 degrees Celsius, or about 51 degrees Celsius, or about 52 degrees Celsius, or about 53 degrees Celsius, or about 54 degrees Celsius, or about 55 degrees Celsius, or about 56 degrees Celsius, or about 57 degrees Celsius, or about 58 degrees Celsius, or about 59 degrees Celsius. In some embodiments, the step-down temperature is about 60 degrees Celsius, or about 61 degrees Celsius, or about 62 degrees Celsius, or about 63 degrees Celsius, or about 64 degrees Celsius, or about 65 degrees Celsius, or about 66 degrees Celsius, or about 67 degrees Celsius, or about 68 degrees Celsius, or about 69 degrees Celsius. In some embodiments, the step-down temperature is about 70 degrees Celsius, or about 71 degrees Celsius, or about 72 degrees Celsius, or about 73 degrees Celsius, or about 74 degrees Celsius, or about 75 degrees Celsius, or about 76 degrees Celsius, or about 77 degrees Celsius, or about 78 degrees Celsius, or about 79 degrees Celsius. In some embodiments, the step-down temperature is about 80 degrees Celsius, or about 81 degrees Celsius, or about 82 degrees Celsius, or about 83 degrees Celsius, or about 84 degrees Celsius, or about 85 degrees Celsius, or about 86 degrees Celsius, or about 87 degrees Celsius, or about 88 degrees Celsius, or about 89 degrees Celsius. In some embodiments, the step-down temperature is about 90 degrees Celsius, or about 91 degrees Celsius, or about 92 degrees Celsius, or about 93 degrees Celsius, or about 94 degrees Celsius, or about 95 degrees Celsius, or about 96 degrees Celsius, or about 97 degrees Celsius, or about 98 degrees Celsius, or about 99 degrees Celsius, or about 100 degrees Celsius. In the above, "about" should be understood to a range of within plus or minus two degrees Celsius; for example, "about 90 degrees Celsius" should be understood to a range of between 88 degrees Celsius and 92 degrees Celsius.

In some embodiments, the controlled cooling rate is between 0.1 degrees Celsius per hour and 20 degrees Celsius per hour. In some embodiments, the controlled cooling rate is between 0.1 degrees Celsius per hour and 15 degrees Celsius per hour. In some embodiments, the controlled cooling rate is between 0.1 degrees Celsius per hour and 10 degrees Celsius per hour. In some embodiments, the controlled cooling rate is between 0.1 degrees Celsius per hour and 8 degrees Celsius per hour. In some embodiments, the controlled cooling rate is between 0.1 degrees Celsius per hour and 6 degrees Celsius per hour. In some embodiments, the controlled cooling rate is between 0.1 degrees Celsius per hour and 4 degrees Celsius per hour. In some embodiments, the controlled cooling rate is between 0.1 degrees Celsius per hour and 2 degrees Celsius per hour. In some embodiments, the controlled cooling rate is between 2 degrees Celsius per hour and 20 degrees Celsius per hour. In some embodiments, the controlled cooling rate is between 2 degrees Celsius per hour and 15 degrees Celsius per hour. In some embodiments, the controlled cooling rate is between 2 degrees Celsius per hour and 10 degrees Celsius per hour. In some embodiments, the controlled cooling rate is between 2 degrees Celsius per hour and 8 degrees Celsius per hour. In some embodiments, the controlled cooling rate is between 2 degrees Celsius per hour and 6 degrees Celsius per hour. In some embodiments, the controlled cooling rate is between 2 degrees Celsius per hour and 4 degrees Celsius per hour. In some embodiments, the controlled cooling rate is between 4 degrees Celsius per hour and 20 degrees Celsius per hour. In some embodiments, the controlled cooling rate is between 4 degrees Celsius per hour and 15 degrees Celsius per hour. In some embodiments, the controlled cooling rate is between 4 degrees Celsius per hour and 10 degrees Celsius per hour. In some embodiments, the controlled cooling rate is between 4 degrees Celsius per hour and 8 degrees Celsius per hour. In some embodiments, the controlled cooling rate is between 4 degrees Celsius per hour and 6 degrees Celsius per hour. In some embodiments, the controlled cooling rate is between 6 degrees Celsius per hour and 20 degrees Celsius per hour. In some embodiments, the controlled cooling rate is between 6 degrees Celsius per hour and 15 degrees Celsius per hour. In some embodiments, the controlled cooling rate is between 6 degrees Celsius per hour and 10 degrees Celsius per hour. In some embodiments, the controlled cooling rate is between 6 degrees Celsius per hour and 8 degrees Celsius per hour. In some embodiments, the controlled cooling rate is between 8 degrees Celsius per hour and 20 degrees Celsius per hour. In some embodiments, the controlled cooling rate is between 8 degrees Celsius per hour and 15 degrees Celsius per hour. In some embodiments, the controlled cooling rate is between 8 degrees Celsius per hour and 10 degrees Celsius per hour. In some embodiments, the controlled cooling rate is between 10 degrees Celsius per hour and 20 degrees Celsius per hour. In some embodiments, the controlled cooling rate is between 10 degrees Celsius per hour and 15 degrees Celsius per hour. In some embodiments, the controlled cooling rate is between 15 degrees Celsius per hour and 20 degrees Celsius per hour.

In step 180, the sealed pressure vessel is allowed to cool to an ambient temperature. In some embodiments, the cooling to ambient temperature includes cooling in a manner that is not controlled to be at any particular rate of cooling (e.g., at an uncontrolled cooling rate). In some embodiments, the cooling to an ambient temperature includes removing the sealed pressure vessel from a controlled environment, such as an oven, and allowing the sealed pressure vessel to cool to ambient temperature in a non-controlled environment, such as within a room (e.g., cooling to room temperature). In some embodiments, step 180 is omitted, and instead the sealed pressure vessel is cooled from the heated temperature to an ambient temperature entirely in a controlled manner and at a controlled cooling rate. In some embodiments, the uncontrolled cooling of step 180 is rapid cooling (e.g., forced cooling, water cooling, etc.) that brings the pressure vessel and the contents thereof to the ambient temperature more quickly than the ambient cooling described above once the controlled cooling has been completed.

In step 190, the sealed pressure vessel is unsealed, and the coated prosthesis core is removed from the pressure vessel. In some embodiments, the particles of the biocompatible metal powder that have not adhered to the prosthesis core during the heated stage remain unaggregated as described above, and are removed from the pressure vessel prior to removing the coated prosthesis core. In some embodiments, the unaggregated particles of the biocompatible metal are suitable for re-use in a subsequent performance of the method 100.

Figure 5:
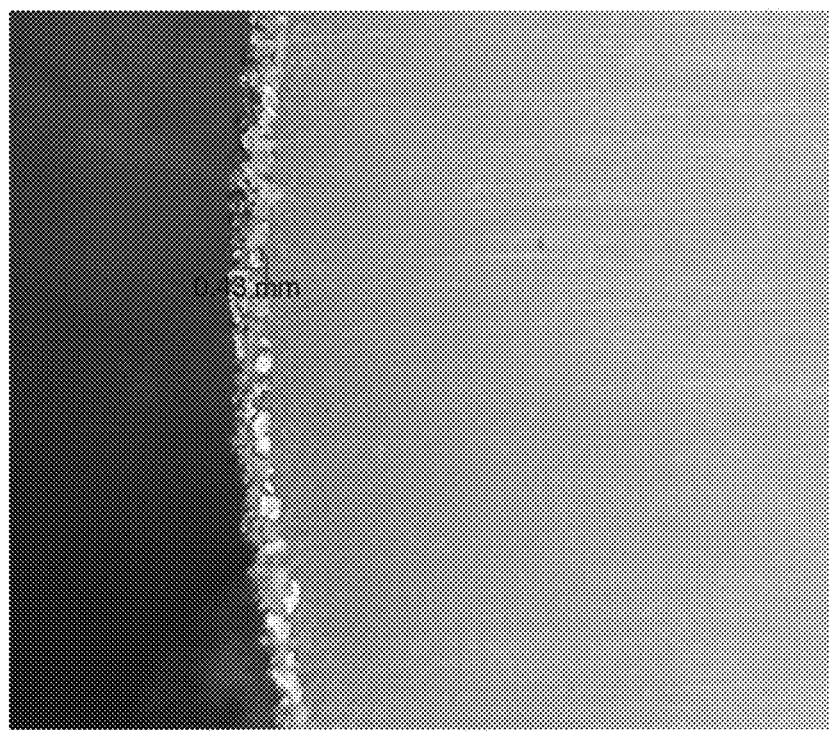
FIG. 5 shows an exemplary coated prosthesis core fabricated in accordance with an exemplary method, the coated prosthesis core having been cut transverse to the coating to show a cross-section of the coating, in accordance with some embodiments of the invention.
Figure 6:
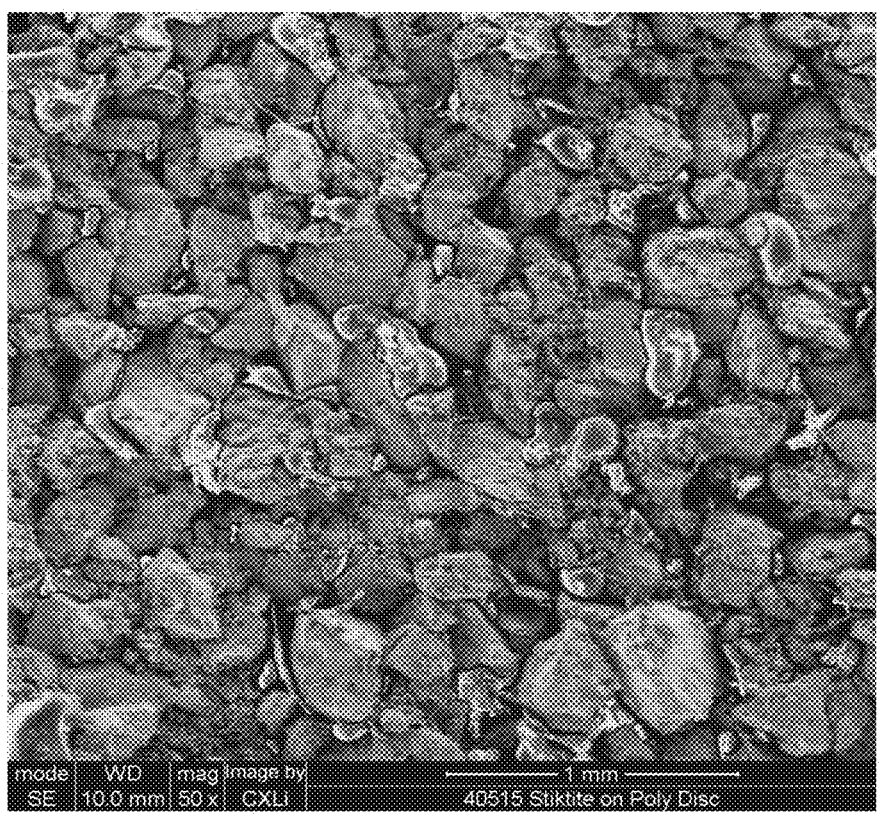
FIG. 6 shows an SEM image of an exemplary coating formed in accordance with an exemplary method in accordance with some embodiments of the invention.

Following step 190, the method 100 is complete. In some embodiments, after completing the coating in accordance with the method 100, the completed prosthesis is exposed to radiation crosslinking to crosslink the polymeric material of the prosthesis core. In some embodiments, the method 100 produces a prosthesis that includes a prosthesis core formed of a polymeric material, such as UHMWPE, having a coating formed from a biocompatible metal powder, such as titanium, and having an uncoated region that is sized and shaped to form an articular surface of the prosthesis. In some embodiments, as described above, the individual particles of the biocompatible metal powder that form the coating do not adhere to one another. FIG. 5 shows a portion of a coated prosthesis core, having been cut perpendicular to the coating to show a cross-section of the coating, in accordance with some embodiments of the invention. FIG. 6 shows a SEM view of a portion of an exemplary coating demonstrating that the particles do not adhere to one another to form a unitary whole, but, rather, remain as discrete particles, in accordance with some embodiments of the invention. In some embodiments, as a result of the formation of a coating formed from the biocompatible metal particles, the coating provides a surface that is conducive to bone ingrowth to facilitate implantation of the prosthesis. Additionally, as a result of the lack of aggregation among the individual particles that form the coating, the coating does not act as a single rigid layer, but, rather, allows the prosthesis to retain flexibility similar to that of the uncoated polymeric material of the core.

Figure 7:
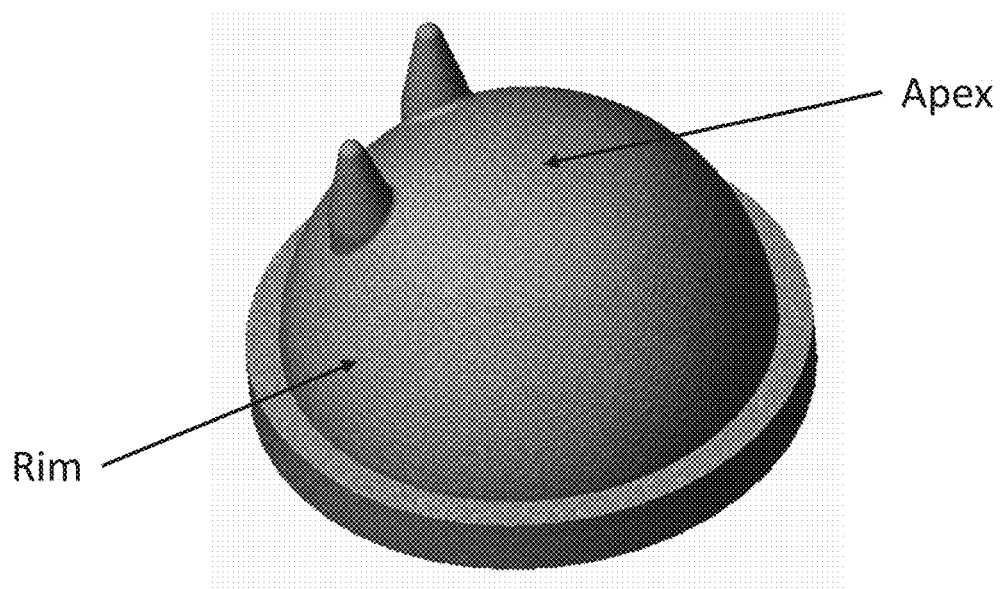
FIG. 7 shows an exemplary acetabular cup prosthesis fabricated in accordance with an exemplary method in accordance with some embodiments of the invention.
Figure 8:
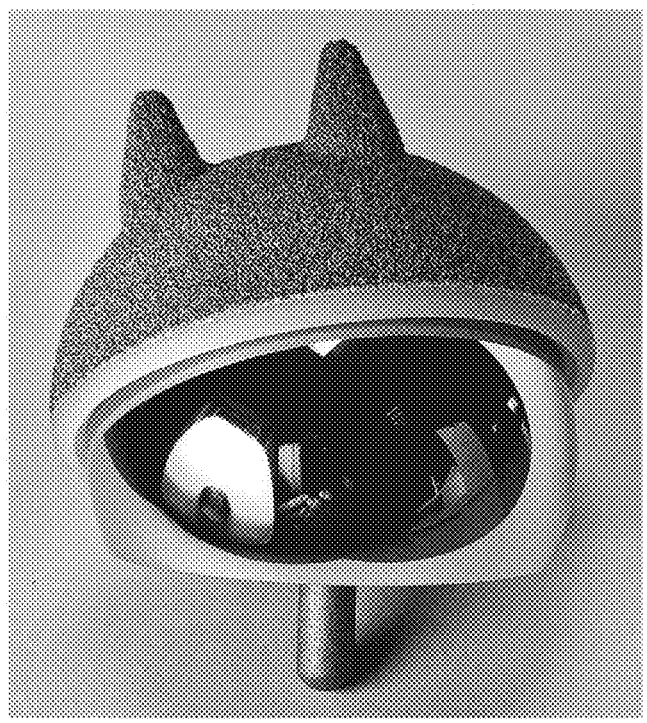
FIG. 8 shows an exemplary acetabular cup prosthesis fabricated in accordance with an exemplary method, as positioned to articulate with a representative prosthetic femoral head, in accordance with some embodiments of the invention.

In some embodiments, due to the adherence between the biocompatible metal powder and the prosthesis core, the coating that is formed on the coated prosthesis core provides advantageous mechanical properties, such as coating thickness, abrasion resistance, shear bond strength, and tensile bond strength, that cause the prosthesis formed from the prosthesis core and the coating to be durable when implanted in the body and to facilitate bone ingrowth into the coating. Additionally, in some embodiments, due to the fact that the particles of the biocompatible metal powder do not adhere to one another to form a unitary whole, and due to the controlled heating and cooling, the polymer core retains the flexibility of the uncoated polymer material. FIG. 7 shows a perspective view of an exemplary acetabular cup prosthesis fabricated in accordance with the techniques described herein. In some embodiments, an exemplary acetabular cup prosthesis is configured for use in a hip resurfacing procedure (e.g., to articulate with a patient's native femoral head, such as the native contact surface of the patient's native femoral head or a resurfacing prosthesis that is applied to the native femoral head). In some embodiments, an exemplary acetabular cup prosthesis is configured for use in a total hip replacement procedure (e.g., to articulate with a prosthetic femoral head). FIG. 8 shows an exemplary acetabular cup prosthesis fabricated in accordance with the techniques described herein, as positioned to articulate with a representative prosthetic femoral head.

In some embodiments, a prosthesis formed in accordance with the exemplary techniques described herein, when tested for abrasion resistance in accordance with ASTM F1978-22, loses less than 65 milligrams of its coating (e.g., between 20 milligrams and 65 milligrams) when abraded for 100 cycles, thereby satisfying FDA guidance for testing metallic plasma sprayed coatings on orthopedic implants. In some embodiments, a prosthesis formed in accordance with the exemplary techniques described herein has a static shear bond strength between its coating and its core of at least 15 MPa (e.g., in a range of from 15 MPa to 25 MPa) when tested in accordance with ISO13779-2:2018, with no value less than 10 MPa, thereby satisfying the standard for shear strength described in ISO13779-2:2018. In some embodiments, a prosthesis formed in accordance with the techniques described herein exhibits a tensile bond strength between its coating and its core at least 14 MPa (e.g., between 14 MPa and 25 MPa) when tested by a test method as described in, or generally in accordance with, the test method described in ASTM F1147-05. In some embodiments, prostheses formed in accordance with the techniques described herein exhibits a mean tensile bond strength that is at least 15 MPa with no values less than 10 MPa when tested by a test method as described in, or generally in accordance with, the test method described in ASTM F1147-05, thereby satisfying the standard for tensile bond strength described in ISO 13779-2:2018. In some embodiments, the core of a prosthesis formed in accordance with the techniques as described herein has a tensile strength that is from 35 MPa to 50 MPa when tested in accordance with ASTM D638-22. In some embodiments, the core of a prosthesis formed in accordance with the techniques as described herein has a compressive modulus that is from 0.8 GPa to 1.2 GPa when tested in accordance with ASTM D695-15.

In some embodiments, a prosthesis as described herein, when tested for static shear bond strength between the prosthesis core and the coating by a static shear bond strength test, has a static shear bond strength that is in a range of from 15 MPa to 35 MPa, or is in a range of from 20 MPa to 35 MPa, or is in a range of from 25 MPa to 35 MPa, or is in a range of from 30 MPa to 35 MPa, or is in a range of from 15 MPa to 30 MPa, or is in a range of from 20 MPa to 30 MPa, or is in a range of from 25 MPa to 30 MPa, or is in a range of from 15 MPa to 25 MPa, or is in a range of from 20 MPa to 25 MPa, or is in a range of from 15 MPa to 20 MPa.

In some embodiments, a prosthesis as described herein, when tested for static tensile bond strength between the prosthesis core and the coating by a static tensile bond strength test, has a static tensile bond strength that is in a range of from 14 MPa to 35 MPa, or is in a range of from 20 MPa to 35 MPa, or is in a range of from 25 MPa to 35 MPa, or is in a range of from 30 MPa to 35 MPa, or is in a range of from 14 MPa to 30 MPa, or is in a range of from 20 MPa to 30 MPa, or is in a range of from 25 MPa to 30 MPa, or is in a range of from 14 MPa to 25 MPa, or is in a range of from 20 MPa to 25 MPa, or is in a range of from 14 MPa to 20 MPa.

In some embodiments, the core of a prosthesis as described herein, when tested for tensile strength by a tensile strength test, has a tensile strength that is in a range of from 35 MPa to 75 MPa, or is in a range of from 45 MPa to 75 MPa, or is in a range of from 55 MPa to 75 MPa, or is in a range of from 65 MPa to 75 MPa, or is in a range of from 35 MPa to 65 MPa, or is in a range of from 45 MPa to 65 MPa, or is in a range of from 55 MPa to 65 MPa, is in a range of from 35 MPa to 55 MPa, or is in a range of from 45 MPa to 55 MPa, or is in a range of from 35 MPa to 45 MPa.

In some embodiments, a prosthesis formed in accordance with the techniques described herein has a mean coating thickness (e.g., as measured at the center of the prosthesis similar to the thickness of the prosthesis core as described above) of between 300 microns and 550 microns. As noted above, in some embodiments, a prosthesis core of a prosthesis formed in accordance with the techniques described herein has a thickness of 5 millimeters to 9 millimeters, depending on the size of the prosthesis. Consequently, in some embodiments, the combined thickness of the prosthesis (e.g., including the prosthesis core and the coating) is in the range of 5,300 microns to 9,550 microns. In some embodiments, the relatively thin overall thickness of the prosthesis is material to the suitability of the prosthesis for use in joint resurfacing, due to being able to provide a sufficiently large concave space within the prosthesis core to accommodate a patient's native femoral head, while not requiring an excessive amount of tissue to be reamed from the patient's pelvis to accommodate the prosthesis due to the relatively thin thickness of the prosthesis.

In some embodiments, a prosthesis formed in accordance with the techniques described herein has a mean coating thickness (i.e., a mean thickness of a coating) of between 300 microns and 550 microns. In some embodiments, a prosthesis has a mean coating thickness of between 300 microns and 500 microns. In some embodiments, a prosthesis has a mean coating thickness of between 300 microns and 450 microns. In some embodiments, a prosthesis has a mean coating thickness of between 300 microns and 400 microns. In some embodiments, a prosthesis has a mean coating thickness of between 300 microns and 350 microns. In some embodiments, a prosthesis has a mean coating thickness of between 350 microns and 550 microns. In some embodiments, a prosthesis has a mean coating thickness of between 350 microns and 500 microns. In some embodiments, a prosthesis has a mean coating thickness of between 350 microns and 450 microns. In some embodiments, a prosthesis has a mean coating thickness of between 350 microns and 400 microns. In some embodiments, a prosthesis has a mean coating thickness of between 400 microns and 550 microns. In some embodiments, a prosthesis has a mean coating thickness of between 400 microns and 500 microns. In some embodiments, a prosthesis has a mean coating thickness of between 400 microns and 450 microns. In some embodiments, a prosthesis has a mean coating thickness of between 450 microns and 550 microns. In some embodiments, a prosthesis has a mean coating thickness of between 450 microns and 500 microns. In some embodiments, a prosthesis has a mean coating thickness of between 550 microns and 550 microns.

In some embodiments, a prosthesis has a mean coating thickness of between 250 microns and 550 microns. In some embodiments, a prosthesis has a mean coating thickness of between 250 microns and 500 microns. In some embodiments, a prosthesis has a mean coating thickness of between 250 microns and 450 microns. In some embodiments, a prosthesis has a mean coating thickness of between 250 microns and 400 microns. In some embodiments, a prosthesis has a mean coating thickness of between 250 microns and 350 microns. In some embodiments, a prosthesis has a mean coating thickness of between 250 microns and 300 microns. In some embodiments, a prosthesis has a mean coating thickness of between 200 microns and 550 microns. In some embodiments, a prosthesis has a mean coating thickness of between 200 microns and 500 microns. In some embodiments, a prosthesis has a mean coating thickness of between 200 microns and 450 microns. In some embodiments, a prosthesis has a mean coating thickness of between 200 microns and 400 microns. In some embodiments, a prosthesis has a mean coating thickness of between 200 microns and 350 microns. In some embodiments, a prosthesis has a mean coating thickness of between 200 microns and 300 microns. In some embodiments, a prosthesis has a mean coating thickness of between 200 microns and 250 microns. In some embodiments, a prosthesis has a mean coating thickness of between 175 microns and 550 microns. In some embodiments, a prosthesis has a mean coating thickness of between 175 microns and 500 microns. In some embodiments, a prosthesis has a mean coating thickness of between 175 microns and 450 microns. In some embodiments, a prosthesis has a mean coating thickness of between 175 microns and 400 microns. In some embodiments, a prosthesis has a mean coating thickness of between 175 microns and 350 microns. In some embodiments, a prosthesis has a mean coating thickness of between 175 microns and 300 microns. In some embodiments, a prosthesis has a mean coating thickness of between 175 microns and 250 microns. In some embodiments, a prosthesis has a mean coating thickness of between 175 microns and 200 microns.

In some embodiments, a prosthesis core of a prosthesis formed in accordance with the techniques described herein has a thickness of 5 millimeters to 9 millimeters. In some embodiments, a prosthesis core has a thickness of 5 millimeters to 8 millimeters. In some embodiments, a prosthesis core has a thickness of 5 millimeters to 7 millimeters. In some embodiments, a prosthesis core has a thickness of 5 millimeters to 6 millimeters. In some embodiments, a prosthesis core has a thickness of 6 millimeters to 9 millimeters. In some embodiments, a prosthesis core has a thickness of 6 millimeters to 8 millimeters. In some embodiments, a prosthesis core has a thickness of 6 millimeters to 7 millimeters. In some embodiments, a prosthesis core has a thickness of 7 millimeters to 9 millimeters. In some embodiments, a prosthesis core has a thickness of 7 millimeters to 8 millimeters. In some embodiments, a prosthesis core has a thickness of 8 millimeters to 9 millimeters.

In some embodiments a prosthesis formed in accordance with the techniques described herein has a combined thickness (e.g., including the respective thicknesses of prosthesis core and the coating) in the range of 5,300 microns to 9,550 microns. In some embodiments, the combined thickness is from 5,300 microns to 8,500 microns. In some embodiments, the combined thickness is from 5,300 microns to 7,500 microns. In some embodiments, the combined thickness is from 5,300 microns to 6,500 microns. In some embodiments, the combined thickness is from 6,500 microns to 9,550 microns. In some embodiments, the combined thickness is from 6,500 microns to 8,500 microns. In some embodiments, the combined thickness is from 6,500 microns to 7,500 microns. In some embodiments, the combined thickness is from 7,500 microns to 9,550 microns. In some embodiments, the combined thickness is from 7,500 microns to 8,500 microns. In some embodiments, the combined thickness is from 8,500 microns to 9,550 microns.

In some embodiments, a device includes a core and a coating layer, wherein the core is a cup-shaped core having a first side and a second side, wherein the first side is concave, and wherein the second side is convex, wherein the core includes ultra-high molecular weight polyethylene, wherein the ultra-high molecular weight polyethylene has a weight average molecular weight that is in a range of from $2\times10^6$ grams per mole to $3\times10^6$ grams per mole, wherein, when tested in accordance with ASTM D638-22, the core has a tensile strength that is in a range of from 35 MPa to 50 MPa, and wherein, when tested in accordance with ASTM D695-15, the core has a compressive modulus that is in a range of from 0.8 GPa to 1.2 GPa; wherein the coating layer coats the second side of the core, wherein the coating layer includes titanium powder, wherein the titanium powder has a D50 particle size of 225 microns, wherein the coating layer has a mean thickness that is in a range of from 300 to 550 microns, wherein the device is an acetabular cup prosthesis, wherein, when tested for abrasion resistance in accordance with ASTM F1978-22, the coating layer loses less than 65 milligrams when abraded for 100 cycles, wherein, when tested for static shear bond strength in accordance with ISO13779-2:2018, the coating layer has a static shear bond strength that is in a range of from 15 MPa to 25 MPa, and wherein, when tested for static tensile bond strength in accordance with ASTM F1147-05, the coating layer has a static tensile bond strength that is in a range of from 14 MPa to 25 MPa.

In some embodiments, a prosthesis coating as described herein has an arithmetic average surface roughness Ra that is in a range of from 35 microns to 45 microns, or is in a range of from 37 microns to 45 microns, or is in a range of from 39 microns to 45 microns, or is in a range of from 41 microns to 45 microns, or is in a range of from 43 microns to 45 microns, or is in a range of from 35 microns to 43 microns, or is in a range of from 37 microns to 43 microns, or is in a range of from 39 microns to 43 microns, or is in a range of from 41 microns to 43 microns, or is in a range of from 35 microns to 41 microns, or is in a range of from 37 microns to 41 microns, or is in a range of from 39 microns to 41 microns, or is in a range of from 35 microns to 39 microns, or is in a range of from 37 microns to 39 microns, or is in a range of from 35 microns to 37 microns.

In some embodiments, a prosthesis core as described herein, when tested for small punch strength in accordance with a small punch test, has a peak load that is in a range of from 70 Newtons to 80 Newtons, or is in a range of from 72 Newtons to 80 Newtons, or is in a range of from 74 Newtons to 80 Newtons, or is in a range of from 76 Newtons to 80 Newtons, or is in a range of from 78 Newtons to 80 Newtons, or is in a range of from 70 Newtons to 78 Newtons, or is in a range of from 72 Newtons to 78 Newtons, or is in a range of from 74 Newtons to 78 Newtons, or is in a range of from 76 Newtons to 78 Newtons, or is in a range of from 70 Newtons to 76 Newtons, or is in a range of from 72 Newtons to 76 Newtons, or is in a range of from 74 Newtons to 76 Newtons, or is in a range of from 70 Newtons to 74 Newtons, or is in a range of from 72 Newtons to 74 Newtons, or is in a range of from 70 Newtons to 72 Newtons. In some embodiments, a prosthesis core as described herein, when tested for small punch testing in accordance with a small punch test, has a peak load that is in a range of from 80 Newtons to 120 Newtons, or is in a range of from 90 Newtons to 120 Newtons, or is in a range of from 100 Newtons to 120 Newtons, or is in a range of from 110 Newtons to 120 Newtons, or is in a range of from 80 Newtons to 110 Newtons, or is in a range of from 90 Newtons to 110 Newtons, or is in a range of from 100 Newtons to 110 Newtons, or is in a range of from 80 Newtons to 100 Newtons, or is in a range of from 90 Newtons to 100 Newtons, or is in a range of from 80 Newtons to 90 Newtons.

In some embodiments, a prosthesis core as described herein, when tested for trans-vinylene index by infrared spectroscopy, has a trans-vinylene index that is in a range of from 0.025 to 0.045, or is in a range of from 0.03 to 0.045, or is in a range of from 0.035 to 0.045, or is in a range of from 0.04 to 0.045, or is in a range of from 0.025 to 0.04, or is in a range of from 0.03 to 0.04, or is in a range of from 0.035 to 0.04, or is in a range of from 0.025 to 0.035, or is in a range of from 0.03 to 0.035, or is in a range of from 0.025 to 0.03.

In some embodiments, a prosthesis core as described herein, when tested for crystallinity by differential scanning calorimetry, has a crystallinity percentage that is in a range of from 55% to 70%, or is in a range of from 58% to 70%, or is in a range of from 61% to 70%, or is in a range of from 64% to 70%, or is in a range of from 67% to 70%, or is in a range of from 55% to 67%, or is in a range of from 58% to 67%, or is in a range of from 61% to 67%, or is in a range of from 64% to 67%, or is in a range of from 55% to 64%, or is in a range of from 58% to 64%, or is in a range of from 61% to 64%, or is in a range of from 55% to 61%, or is in a range of from 58% to 61%, or is in a range of from 55% to 58%, or is in a range of from 60% to 70%, or is in a range of from 65% to 70%, or is in a range of from 55% to 65%, or is in a range of from 60% to 65%, or is in a range of from 55% to 60%.

In some embodiments, a prosthesis core as described herein, when tested for impact strength by an Izod impact strength test, has an impact strength that is in a range of from 65 kJ/m$^2$ to 75 kJ/m$^2$, or is in a range of from 67 kJ/m$^2$ to 75 kJ/m$^2$, or is in a range of from 69 kJ/m$^2$ to 75 KJ/m$^2$, or is in a range of from 71 kJ/m$^2$ to 75 kJ/m$^2$, or is in a range of from 73 kJ/m$^2$ to 75 kJ/m$^2$, or is in a range of from 65 kJ/m$^2$ to 73 kJ/m$^2$, or is in a range of from 67 kJ/m$^2$ to 73 kJ/m$^2$, or is in a range of from 69 kJ/m$^2$ to 73 kJ/m$^2$, or is in a range of from 71 kJ/m$^2$ to 73 kJ/m$^2$, or is in a range of from 65 kJ/m$^2$ to 71 kJ/m$^2$, or is in a range of from 67 kJ/m$^2$ to 71 kJ/m$^2$, or is in a range of from 69 kJ/m$^2$ to 71 kJ/m$^2$, or is in a range of from 65 kJ/m$^2$ to 69 kJ/m$^2$, or is in a range of from 67 kJ/m$^2$ to 69 kJ/m$^2$, or is in a range of from 65 kJ/m$^2$ to 67 kJ/m$^2$, or is in a range of from 70 kj/m$^2$ to 100 kj/m$^2$, or is in a range of from 75 kj/m$^2$ to 100 kj/m$^2$, or is in a range of from 80 kj/m$^2$ to 100 kj/m$^2$, or is in a range of from 85 kj/m$^2$ to 100 kj/m$^2$, or is in a range of from 90 kj/m$^2$ to 100 kj/m$^2$, or is in a range of from 95 kj/m$^2$ to 100 kj/m$^2$, or is in a range of from 70 kj/m$^2$ to 95 kj/m$^2$, or is in a range of from 75 kj/m$^2$ to 95 kj/m$^2$, or is in a range of from 80 kj/m$^2$ to 95 kj/m$^2$, or is in a range of from 85 kj/m$^2$ to 95 kj/m$^2$, or is in a range of from 90 kj/m$^2$ to 95 kj/m$^2$, or is in a range of from 70 kj/m$^2$ to 90 kj/m$^2$, or is in a range of from 75 kj/m$^2$ to 90 kj/m$^2$, or is in a range of from 80 kj/m$^2$ to 90 kj/m$^2$, or is in a range of from 85 kj/m$^2$ to 90 kj/m$^2$, or is in a range of from 70 kj/m$^2$ to 85 kj/m$^2$, or is in a range of from 75 kj/m$^2$ to 85 kj/m$^2$, or is in a range of from 80 kj/m$^2$ to 85 kj/m$^2$, or is in a range of from 70 kj/m$^2$ to 80 kj/m$^2$, or is in a range of from 75 kj/m$^2$ to 80 kj/m$^2$, or is in a range of from 70 kj/m$^2$ to 75 kj/m$^2$.

In some embodiments, a prosthesis core as described herein, when tested for crosslink density by a crosslink density test, has a crosslink density that is in a range of from 0.15 mol/dm$^3$ to 0.2 mol/dm$^3$, or is in a range of from 0.16 mol/dm$^3$ to 0.2 mol/dm$^3$, or is in a range of from 0.17 mol/dm$^3$ to 0.2 mol/dm$^3$, or is in a range of from 0.18 mol/dm$^3$ to 0.2 mol/dm$^3$, or is in a range of from 0.19 mol/dm$^3$ to 0.2 mol/dm$^3$, or is in a range of from 0.15 mol/dm$^3$ to 0.19 mol/dm$^3$, or is in a range of from 0.16 mol/dm$^3$ to 0.19 mol/dm$^3$, or is in a range of from 0.17 mol/dm$^3$ to 0.19 mol/dm$^3$, or is in a range of from 0.18 mol/dm$^3$ to 0.19 mol/dm$^3$, or is in a range of from 0.15 mol/dm$^3$ to 0.18 mol/dm$^3$, or is in a range of from 0.16 mol/dm$^3$ to 0.18 mol/dm$^3$, or is in a range of from 0.17 mol/dm$^3$ to 0.18 mol/dm$^3$, or is in a range of from 0.15 mol/dm$^3$ to 0.17 mol/dm$^3$, or is in a range of from 0.16 mol/dm$^3$ to 0.17 mol/dm$^3$, or is in a range of from 0.15 mol/dm$^3$ to 0.16 mol/dm$^3$.

In some embodiments, a prosthesis core as described herein, when tested for compressive modulus by a compressive modulus test, has a compressive modulus that is in a range of from 0.8 GPa to 1.2 GPa, or is in a range of from 0.9 GPa to 1.2 GPa, or is in a range of from 1 GPa to 1.2 GPa, or is in a range of from 1.1 GPa to 1.2 GPa, or is in a range of from 0.8 GPa to 1.1 GPa, or is in a range of from 0.9 GPa to 1.1 GPa, or is in a range of from 1 GPa to 1.1 GPa, or is in a range of from 0.8 GPa to 1 GPa, or is in a range of from 0.9 GPa to 1 GPa, or is in a range of from 0.8 GPa to 0.9 GPa. In some embodiments, a prosthesis core as described herein, when tested for compressive modulus by a compressive modulus test, has a compressive modulus that is in a range of from 3 GPa to 4 GPa, or is in a range of from 3.25 GPa to 4 GPa, or is in a range of from 3.5 GPa to 4 GPa, or is in a range of from 3.75 GPa to 4 GPa, or is in a range of from 3 GPa to 3.75 GPa, or is in a range of from 3.25 GPa to 3.75 GPa, or is in a range of from 3.5 GPa to 3.75 GPa, or is in a range of from 3 GPa to 3.5 GPa, or is in a range of from 3.25 GPa to 3.25 GPa, or is in a range of from 3 GPa to 3.5 GPa.

In some embodiments, a prosthesis core as described herein, when tested for wear resistance by a fatigue crack propagation test, has a Paris exponent m that is in a range of from 6 to 7, or is in a range of from 6.2 to 7, or is in a range of from 6.4 to 7, or is in a range of from 6.6 to 7, or is in a range of from 6.8 to 7, or is in a range of from 6 to 6.8, or is in a range of from 6.2 to 6.8, or is in a range of from 6.4 to 6.8, or is in a range of from 6.6 to 6.8, or is in a range of from 6 to 6.6, or is in a range of from 6.2 to 6.6, or is in a range of from 6.4 to 6.6, or is in a range of from 6 to 6.4, or is in a range of from 6.2 to 6.4, or is in a range of from 6 to 6.2.

In some embodiments, a prosthesis core as described herein, when tested for wear resistance by a fatigue crack propagation test, has a Paris coefficient C that is in a range of from $8 \times 10^{-6}$ to $11.5 \times 10^{-6}$, or is in a range of from $8.7 \times 10^{-6}$ to $11.5 \times 10^{-6}$, or is in a range of from $9.4 \times 10^{-6}$ to $11.5 \times 10^{-6}$, or is in a range of from $10.1 \times 10^{16}$ to $11.5 \times 10^{-6}$, or is in a range of from $10.8 \times 10^{-6}$ to $11.5 \times 10^{-6}$, or is in a range of from $8 \times 10^{-6}$ to $10.8 \times 10^{-6}$, or is in a range of from $8.7 \times 10^{-6}$ to $10.8 \times 10^{-6}$, or is in a range of from $9.4 \times 10^{-6}$ to $10.8 \times 10^{-6}$, or is in a range of from $10.1 \times 10^{-6}$ to $10.8 \times 10^{-6}$, or is in a range of from $8 \times 10^{-6}$ to $10.1 \times 10^{-6}$, or is in a range of from $8.7 \times 10^{-6}$ to $10.1 \times 10^{-6}$, or is in a range of from $9.4 \times 10^{-6}$ to $10.1 \times 10^{-6}$, or is in a range of from $8 \times 10^{-6}$ to $9.4 \times 10^{-6}$, or is in a range of from $8.7 \times 10^{-6}$ to $9.4 \times 10^{-6}$, or is in a range of from $8 \times 10^{-6}$ to $8.7 \times 10^{-6}$.

In some embodiments, an uncoated face of a prosthesis core as described herein, when tested for oxidation by an oxidation test, has an oxidation index that is in a range of from 0.06 to 0.1, or is in a range of from 0.07 to 0.1, or is in a range of from 0.08 to 0.1, or is in a range of from 0.09 to 0.1, or is in a range of from 0.06 to 0.09, or is in a range of from 0.07 to 0.09, or is in a range of from 0.08 to 0.09, or is in a range of from 0.06 to 0.08, or is in a range of from 0.07 to 0.08, or is in a range of from 0.06 to 0.07. In some embodiments, a coated face of a prosthesis core as described herein, when tested for oxidation by an oxidation test, has an oxidation index that is in a range of from 0.03 to 0.07, or is in a range of from 0.04 to 0.07, or is in a range of from 0.05 to 0.07, or is in a range of from 0.06 to 0.07, or is in a range of from 0.03 to 0.06, or is in a range of from 0.04 to 0.06, or is in a range of from 0.05 to 0.06, or is in a range of from 0.03 to 0.05, or is in a range of from 0.04 to 0.05, or is in a range of from 0.03 to 0.04. In some embodiments, a bulk portion of a prosthesis core as described herein, when tested for oxidation by an oxidation test, has an oxidation index that is in a range of from 0.01 to 0.03.

In some embodiments, an uncoated face of a prosthesis core as described herein, when tested for oxidation by an oxidation test after being subjected to an accelerated aging process, has an oxidation index that is in a range of from 0.15 to 0.19, or is in a range of from 0.16 to 0.19, or is in a range of from 0.17 to 0.19, or is in a range of from 0.18 to 0.19, or is in a range of from 0.15 to 0.18, or is in a range of from 0.16 to 0.18, or is in a range of from 0.17 to 0.18, or is in a range of from 0.15 to 0.17, or is in a range of from 0.16 to 0.17, or is in a range of from 0.15 to 0.16. In some embodiments, a coated face of a prosthesis core as described herein, when tested for oxidation by an oxidation test after being subjected to an accelerated aging process, has an oxidation index that is in a range of from 0.15 to 0.19, or is in a range of from 0.16 to 0.19, or is in a range of from 0.17 to 0.19, or is in a range of from 0.18 to 0.19, or is in a range of from 0.15 to 0.18, or is in a range of from 0.16 to 0.18, or is in a range of from 0.17 to 0.18, or is in a range of from 0.15 to 0.17, or is in a range of from 0.16 to 0.17, or is in a range of from 0.15 to 0.16. In some embodiments, a bulk portion of a prosthesis core as described herein, when tested for oxidation by an oxidation test after being subjected to an accelerated aging process, has an oxidation index that is in a range of from 0.03 to 0.05.

In some embodiments, a method for producing a prosthesis includes fabricating a prosthesis core from a core material, wherein the core material comprises ultra-high molecular weight polyethylene, wherein the ultra-high molecular weight polyethylene has a weight average molecular weight that is in a range of from $2 \times 10^6$ grams per mole to $3 \times 10^6$ grams per mole; positioning the prosthesis core within a pressure vessel, wherein the prosthesis core has a prosthesis core height within the pressure vessel; filling the pressure vessel with titanium powder, wherein the titanium powder has a D50 particle size of 225 microns, wherein the titanium powder is filled to at least 110% of the core height; sealing the pressure vessel, wherein the sealing the pressure vessel comprises positioning a pressure plate in contact with the titanium powder; maintaining the pressure vessel at a temperature that is in a range of from 150 degrees Celsius to 200 degrees Celsius and a pressure that is in a range of from 10 MPa to 50 MPa for a time period that is in a range of from 10 minutes to 600 minutes, cooling the pressure vessel to room temperature, wherein the cooling includes a controlled cooling phase in which the pressure vessel is cooled from the heated temperature to a step-down temperature at a controlled cooling rate, wherein the controlled cooling rate is in a range of from 0.1 degrees Celsius per hour to 10 degrees Celsius per hour, wherein the method produces an acetabular cup prosthesis including the prosthesis core and a coating layer, wherein the prosthesis core is a cup-shaped core having a first side and a second side, wherein the first side is concave, and wherein the second side is convex, wherein the coating layer coats the second side of the core, wherein the coating layer includes the titanium powder, and wherein the coating layer has a mean thickness that is in a range of from 300 to 550 microns, wherein, when tested for abrasion resistance in accordance with ASTM F1978-22, the coating layer loses less than 65 milligrams when abraded for 100 cycles, wherein, when tested for static shear bond strength in accordance with ISO13779-2:2018, the coating layer has a static shear bond strength that is in a range of from 15 MPa to 25 MPa, and wherein, when tested for static tensile bond strength in accordance with ASTM F1147-05, the coating layer has a static tensile bond strength that is in a range of from 15 MPa to 25 MPa.

Test Methods

Shear Bond Strength

A prosthesis as described herein may be tested for static shear bond strength between the core and the coating layer by a method similar to that described in ISO13779-2:2018. The static shear bond strength test method described by ISO13779-2:2018 is specified for surgical implants having coatings applied to a metallic core, but may be unsuitable for testing prosthetics as described herein due to the fact that the exemplary prosthetics include a curved coated surface, which is only coated on the outer side thereof. Accordingly, rather than testing a sample of the exemplary prosthetics described herein, the test method for static shear bond strength includes testing of coated coupons similar to the standard test methods for spray coatings such as described in ISO13779-2:2018. In particular, the test method includes the use of a cylindrical coupon that is 10 millimeters in diameter and either 8 millimeters or 6 millimeters thick (further discussion of thickness is presented below) and made from the same material as the exemplary prosthesis cores described herein. The coupon is coated by a coating of metallic particles in accordance with the same process described herein to fabricate a coated prosthesis. The coated coupon is therefore representative of the exemplary prosthetics described herein.

Figure 9:
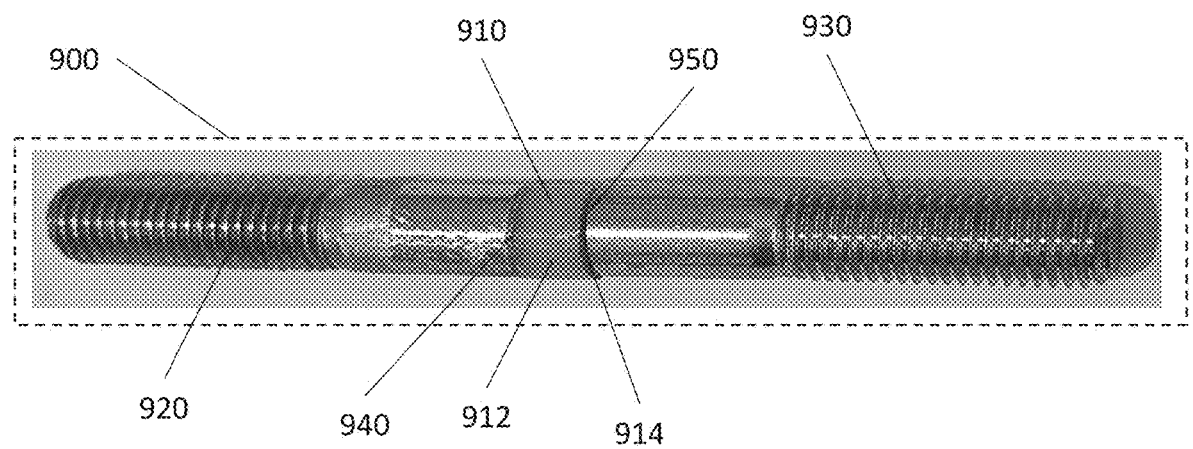
FIG. 9 shows a test sample prepared for use in static shear bond strength testing.

Specimen blanks as described in ISO13779-2:2018 were grit blasted with titanium powder to avoid contamination of the interface region between the specimen blanks and the test coupon. The blasted surfaces were then adhered to opposite sides of the test coupon using adhesive commercialized under the trade name XDF 4600 by Dow of Midland, Michigan, in an amount sufficient to form a bead all the way around the contact area when the coupon is clamped flat against the specimen blank. The adhesive was cured at 171 degrees Celsius for 180 minutes, and then allowed to cool to ambient temperature and held at ambient temperature for 24 hours prior to testing. FIG. 9 shows a test sample 900 as prepared in this manner. The test sample includes a test coupon 910. The test coupon 910 includes a polymer portion 912, which is representative of the prosthesis core described herein, and a coating 914 adhered to the polymer portion 912 in accordance with the exemplary process described herein. The test sample 900 also includes specimen blanks 920 and 930 as described in ISO13779-2:2018. The test coupon 910 is adhered to the specimen blanks 920 and 930 by adhesive 940 and 950 as described above.

Figure 10:
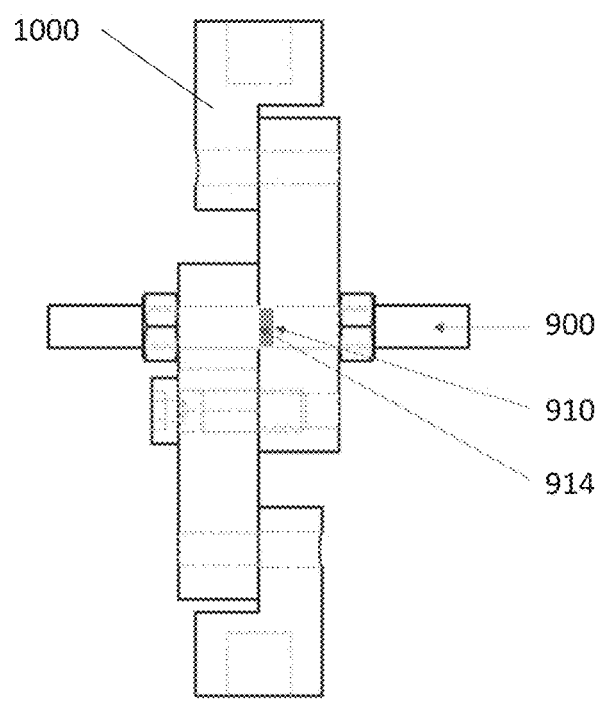
FIG. 10 shows a test setup used for static shear bond strength testing.

A test sample prepared as described herein was mounted into a gripping device for testing. The gripping device was of the type commercialized under the trade name Z3-X500 by AML Instruments of Lincoln, UK, and included a 3000 N load cell. The gripping device was an aligned interface type device which positions the coating test plane parallel to the direction of load application in order to apply an axial load that provides shear stress to the test sample. The gripping device is consistent with that described in ASTM F1044-05 and ASTM1160-14. FIG. 10 shows a schematic view of the testing setup. The grip assembly 1000 receives the test sample 900, prepared as described above. The test coupon 910 is positioned adjacent to the interface region between the two opposing sides of the grip assembly 1000, with the coating 914 positioned at the interface such that axial force applied by the grip assembly 1000 is experienced as a shear load across the bond between the polymer portion 912 and the coating 914.

Five samples from each of fifteen production batches (including eight thick-walled production batches having a wall thickness of 8 mm and seven thin-walled production batches having a wall thickness of 6 mm), totaling 75 samples, were tested. The testing device was configured to apply no preload, to move at a speed of 2 millimeters per minute to a maximum displacement of 10 millimeters, and to apply a maximum load of 2000 N. The force-displacement curve and shear strength were determined and recorded for each specimen. The failure mode(s) was reported from visual inspection of each specimen. The mean strength was determined for each batch. The acceptance criteria were achieved when the average strength over the batch was greater than 15 MPa and no sample in the batch had a strength of less than 10 MPa, in accordance with the standards set out in ISO 13779-2:2018.

Results of testing of the samples described above were as follows. Five samples from each of eight batches of thick-walled cups, totaling 40 samples, were tested. Across these 40 samples, the mean average shear strength was 18 MPa. The entire set of samples was assessed by T-test and the lower 95% confidence interval was 17.2 MPa. The lowest individual shear strength observed among the 40 samples was 10.8 MPa.

Additionally, five samples from each of seven batches of thin-walled cups, totaling 35 samples, were tested. Across these 35 samples, the mean average shear strength was 16.7 MPa. The entire set of samples was assessed by T-test and the lower bound of the 95% confidence interval was 15.9 MPa. The lowest individual shear strength observed among the 35 samples was 12.3 MPa.

For both thick-walled (i.e., 8 millimeters thick) and thin-walled (i.e., 6 millimeters thick) cups, the mean strength of all parts in each batch was greater than 15 MPa, and no individual results was less than 10 MPa. Although the average strength for thick-walled cups is greater than for thin-walled cups, there was no significant difference in the results. Additionally, no relationship was observed between cup outside diameter and bond shear strength. Accordingly, the test samples were deemed to meet the standards set out in ISO 13779-2:2018.

Tensile Bond Strength

A prosthesis as described herein may be tested for static tensile bond strength between the core and the coating layer by a method similar to that described in ASTM F1147-05. The static tensile bond strength test method described by ASTM F1147-05 is specified for surgical implants having coatings applied to a metallic core, but may be unsuitable for testing prosthetics as described herein due to the fact that the exemplary prosthetics include a curved coated surface, which is only coated on the outer side thereof. Accordingly, rather than testing a sample of the exemplary prosthetics described herein, the test method for static tensile bond strength includes testing of coated coupons similar to the standard test methods for spray coatings such as described in ASTM F1147-05. In particular, the test method includes the use of a cylindrical coupon that is 10 millimeters in diameter and 8 millimeters thick and made from the same material as the exemplary prosthesis cores described herein. The coupon is coated by a coating of metallic particles in accordance with the same process described herein to fabricate a coated prosthesis. The coated coupon is therefore representative of the exemplary prosthetics described herein.

Specimen blanks as described in ASTM F1147-05 were grit blasted with titanium powder to avoid contamination of the interface region between the specimen blanks and the test coupon. The blasted surfaces were then adhered to opposite sides of the test coupon using the adhesive commercialized under the trade name XDF 4600 by Dow of Midland, Michigan, in an amount sufficient to form a bead all the way around the contact area when the coupon is clamped flat against the specimen blank. The adhesive was cured at 171 degrees Celsius for 180 minutes, and then allowed to cool to ambient temperature and held at ambient temperature for 24 hours prior to testing. The test sample used for tensile bond strength was therefore essentially identical to that used for shear bond testing, as shown in FIG. 9 and described above with reference to FIG. 9.

Figure 11:
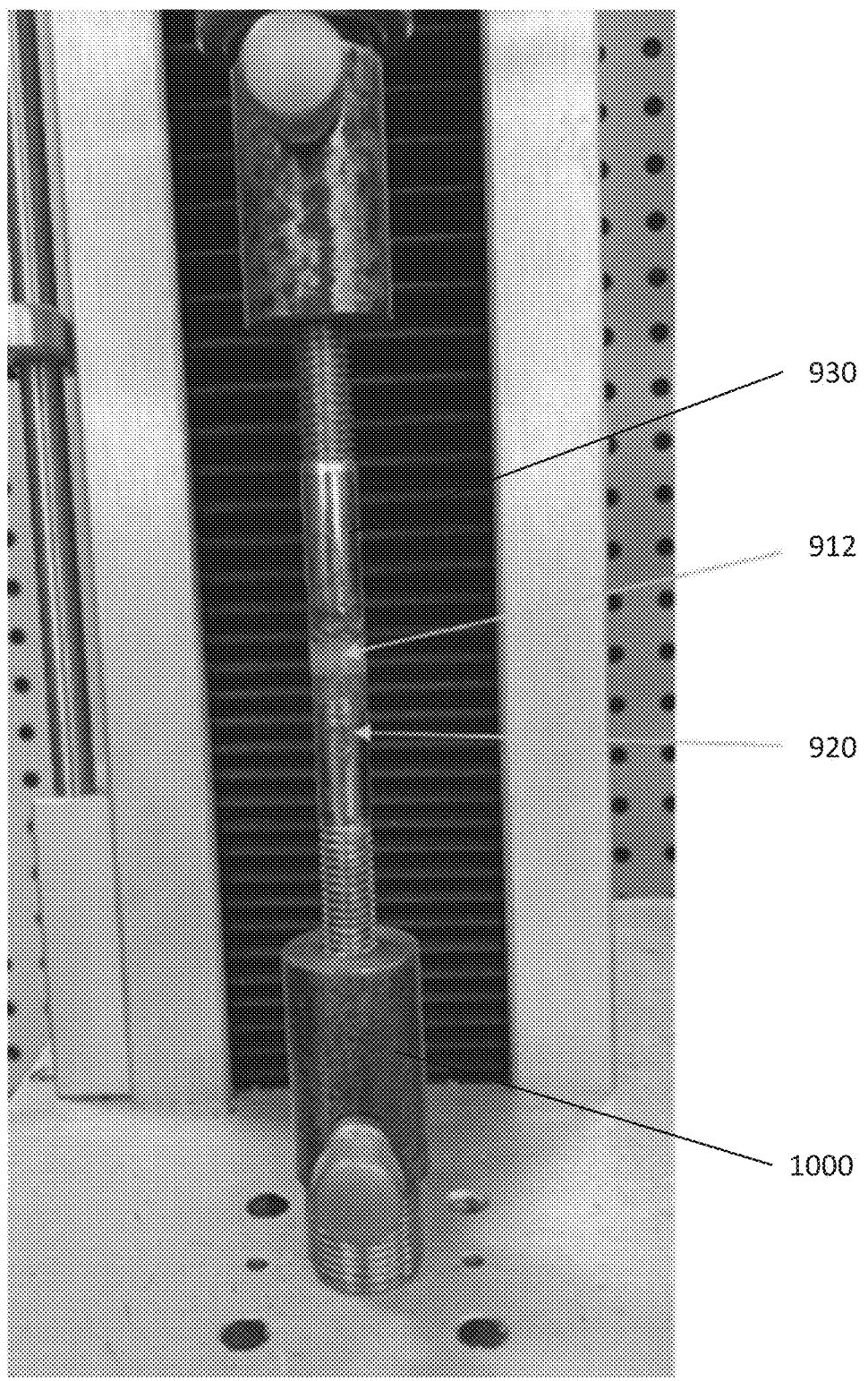
FIG. 11 shows a test setup used for static tensile bond strength testing.

The test sample prepared as described herein was mounted into a gripping device for testing. The gripping device was of the type commercialized under the trade name Z3-X500 by AML Instruments of Lincoln, UK and included a 3000 N load cell. The test sample was positioned within the gripping device in an orientation such that the coating test plane was perpendicular to the direction of load application in order to apply an axial load that provides tensile stress to the test sample. The gripping device is consistent with that described in ASTM F1147-05. FIG. 11 shows a photograph of the testing setup. The grip assembly 1000 receives the test sample 900, prepared as described above. The test coupon 910 is between the two opposing sides of the grip assembly 1000, with the coating 914 positioned such that axial force applied by the grip assembly 1000 is experienced as a tensile load across the bond between the polymer portion 912 and the coating 914.

Two test coupons were prepared during each of twenty-one separate production batches of prosthetics and coupons in the manner described above. Two test coupons were prepared for testing in each batch in the event that one coupon was spoiled during preparation, or that an adhesive failure occurred at the contact surface between the test coupon and the specimen blanks rather than at the interface between the polymer portion and the coating. Test samples that experienced adhesive failure are omitted from the data due to not being indicative of the tensile bond strength between the polymer portion and the coating. The testing device was configured to apply no preload, to move at a speed of 2 millimeters per minute to a maximum displacement of 10 millimeters, and to apply a maximum load of 2000 N. The force-displacement curve and tensile strength were determined and recorded for each specimen. The failure mode(s) was reported from visual inspection of each specimen. The mean strength was determined across all test samples. The acceptance criteria were achieved when the average strength over the batch was greater than 15 MPa and no sample in the set of test samples had a strength of less than 10 MPa, in accordance with the standards set out in ASTM F1147-05.

Results of testing of the samples described above were as follows. 21 samples were tested. Across these 21 samples, the mean average tensile strength was 16.7 MPa. The entire set of samples was assessed by T-test and the lower bound of the 95% confidence interval was 15.1 MPa. The lowest individual tensile strength observed among the 21 samples was 13.5 MPa. Accordingly, the test samples were deemed to meet the standards set out in ASTM F1147-05.

Coating Thickness

Figure 12:
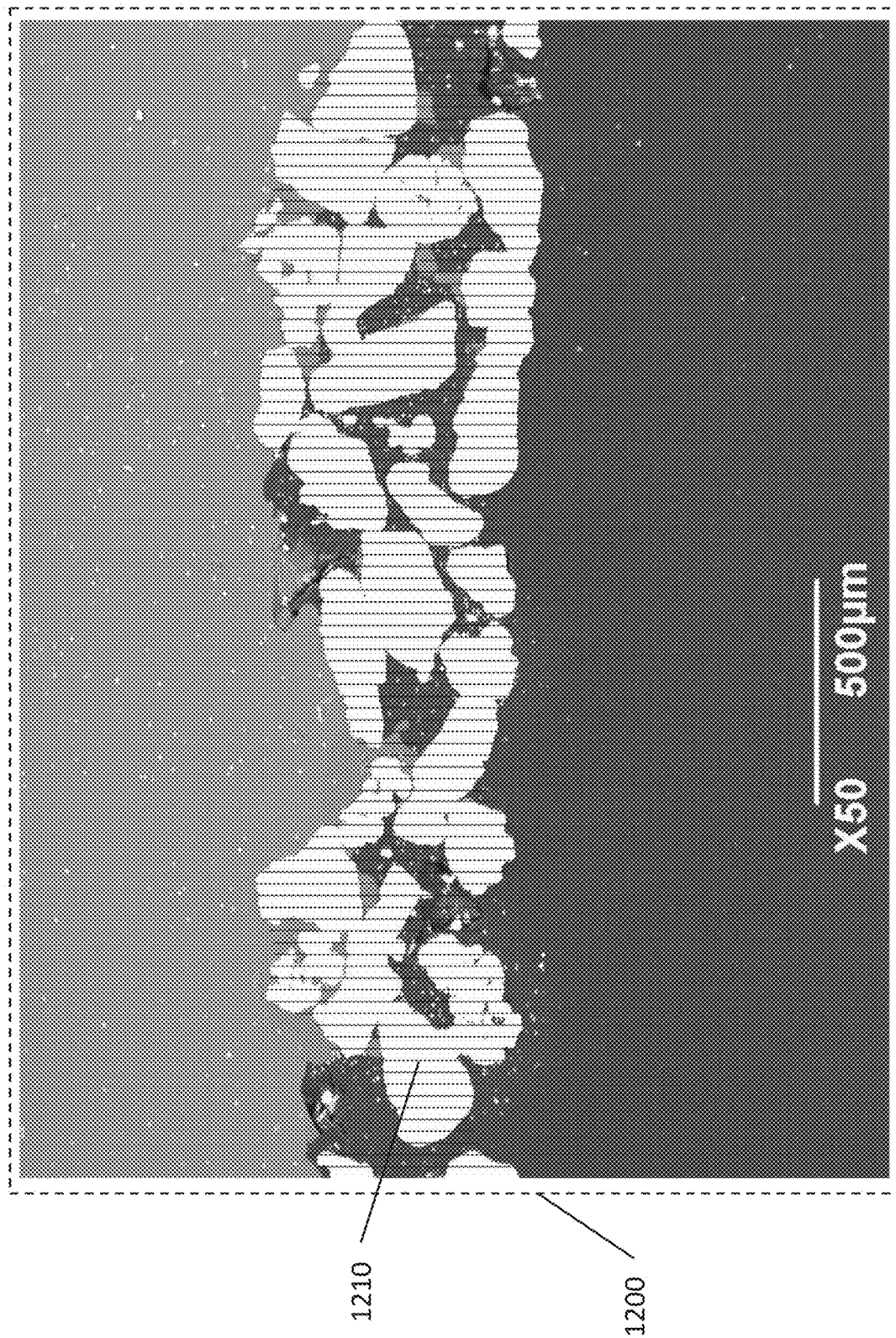
FIG. 12 shows a representative image obtained and analyzed during coating thickness testing.

Thickness of the metallic coating applied to a polymeric prosthesis core was determined optically. Samples of three different sizes of prosthesis were tested, and thickness was characterized at both an apex region and a rim region (see FIG. 7) of each sample. Three non-overlapping back scattered scanning electron microscope images of the sample including both the metallic coating and the prosthesis core were captured at ×50 magnification for stereological evaluation. Thickness measurements were taken at 100 equally spaced grid lines along the interface between the prosthesis core and the titanium coating using line scans perpendicular to the core/coating interface at each point. Spacing between adjacent grid lines was 25 microns. FIG. 12 shows an exemplary image 1200 of a sample used in this process including gridlines 1210 (only one specifically identified in in the figure for clarity) that were sued to evaluate thickness. Across the six evaluated locations (i.e., two locations on each of three samples), the mean measured thickness was 343.8 microns. The lowest mean thickness for any one of the evaluated locations was 197.6 microns and the highest mean thickness for any one of the evaluated locations was 498.7 microns.

Coating Roughness

Roughness of the metallic coating applied to a polymeric prosthesis core was determined optically. Samples of three different sizes of prosthesis were tested, and roughness was characterized at both an apex region and a rim region (see FIG. 7) of each sample. Stripes were projected onto a sample using an optical 3D measuring instrument of the type commercialized by LMI Technologies Inc. of Burnaby, British Columbia, Canada under the trade name MIKRO-CAD. Specifically, stripes with sine-shaped brightness gradients were projected onto the surface of the measured object, and their image was recorded by a CCD camera. The height image of the measurement object is calculated from the position of the strips and the grey value of the individual image points. The resolution of the measurements by DSP are <20 μm in the X and Y (lateral) axes and <0.5 μm in the Z (height) axis. Fields of view in each coupon were scanned over an area of 13.0 mm×8.3 mm using a Z (height) range of 0.56 mm. Using ODSCAD software that is provided with the 3D measuring instrument referenced above, height images were filtered for alignment, invalid features and peaks were moved, and calculation of line profiles roughness in an area was carried out. Removal of geometric form in the height image was carried out using polynomial filtering to allow for accurate roughness measurement. A cut-off value of 2.5 mm was used for a roughness evaluation length of 12.5 mm as recommended in ISO4288-1996. Roughness parameters Ra, Rz, Rp, Rv, and Rsk were obtained along seven profile lines in each image, and the mean of each value was also calculated. Across seven profile lines for each of six images (i.e., the apex and the rim of each of three different sizes), the mean average roughness Ra was 40 microns and the standard deviation was 4 microns.

Testing of Properties of Prosthesis Core

In some cases, the material properties of the polymer prosthesis core may be affected by the coating process (e.g., heating, pressurization, etc.). Accordingly, to characterize the properties of the polymeric material that forms the prosthesis core as fabricated as described above, test specimens were prepared as follows. Cylindrical specimen "pucks" 74 millimeters in diameter and 20 millimeters in thickness were formed from ultrahigh molecular weight polyethylene, and a coating comprised of titanium powder was applied to one of the circular faces of the pucks in accordance with the exemplary embodiments described above. The coated pucks were subjected to crosslinking and sterilization. The coating was then removed by machining in accordance with known machining techniques. Specimens of the appropriate size for a given test to be performed were taken from the formerly coated face, the uncoated face, or the center of the puck away from either face (i.e., the "bulk" of the puck).

Accelerated Aging

Some of the specimens fabricated as described above were subjected to accelerated aging prior to testing for specific material properties in order to demonstrate the manner in which the prosthetic devices describe herein maintain relevant characteristics over time. Accelerated aging was performed by cyclic application of heat and pressure in accordance with processes described in ASTM F2003-02 (2015) and ISO 5834-3:2019.

Fatigue Crack Propagation

To perform fatigue crack propagation testing in order to evaluate wear resistance, 2.5 millimeters of material was removed from each face of the puck to produce a puck 15 millimeters in thickness. Pucks sized in this manner were tested both with and without accelerated aging as described above. Specimens were made from the pucks scaled to a value of W=40 millimeters in accordance with ASTM E647. The specimens were subjected to fatigue crack propagation testing using a servo-hydraulic testing machine operated to provide a sinusoidal waveform of 3 Hz and R ratio of 0.1 (minimum load/maximum load) was used for all loading. An air jet was used to cool the specimens during loading. Crack length was measured for every 0.1 mm of crack extension. Specimens were tested to failure (full fracture or until extensive specimen deformation inhibited crack length measurement).

Based on measurements obtained in accordance with the above, fatigue crack growth rate (da/dN), and cyclic stress intensity factor (ΔK) were calculated in accordance ASTM E647 and ASTM E399. Linear regression of the linear portion of the log-log data was used to determine the exponent (m) and coefficient (C) of the Paris relationship ($da/dN = C\Delta K^m$). The Paris regime was defined between crack growth rates (da/dN) of a minimum of $10^{-4}$ mm/cycle to a maximum of 10-2 mm/cycle. Specimens that had not been subjected to accelerated aging exhibited a mean average Paris exponent m of 6.5 with a standard deviation of 0.4, and a mean average Paris coefficient C of $9.7 \times 10^{-6}$ with a standard deviation of $1.6 \times 10^{-6}$. Specimens that were subjected to accelerated aging exhibited a mean average Paris exponent m of 6.6 with a standard deviation of 0.3, and a mean average Paris coefficient C of $1.2 \times 10^{-5}$ with a standard deviation of $4.1 \times 10^6$.

Abrasion Resistance

Abrasion wear testing was performed generally in accordance with ASTM F1978-22. To perform abrasion resistance testing, eight sample coated discs were produced, with seven samples used in accordance with ASTM F1978-22. Each sample had a diameter of 90-100 millimeters and a thickness of 1.6 millimeters, had a centered hole of 6.4 millimeters drilled to fit onto the testing machine, and was coated in accordance with the process described above. Prior to testing, the samples were subjected to ultrasonic cleaning, dried by heating, and cooled to room temperature.

Following preparation as described above, six samples were tested using a taber rotary abraser, while the seventh sample was designated a "blank" and was not abraded but kept as a control to measure weight loss caused by ultrasonic cleaning, as described in ASTM F1978-22. Each sample was weighed after 2 cycles, after 3 further cycles to arrive at 5 cumulative cycles, after 5 further cycles to arrive at 10 cumulative cycles, and after 90 further cycles to arrive at 100 cumulative cycles, with three separate measurements of weight taken at each measurement instance and then averaged to account for measurement inaccuracies, in accordance with ASTM F1978-22. Among the six abraded samples, the mean weight lost after 100 total cycles was 50 milligrams with a standard deviation of 15 milligrams. The highest individual value of weight lost measured for a sample after 100 total cycles was 64 milligrams.

The ASTM F1978-22 standard provides a testing procedure but does not establish a benchmark or threshold acceptable value. The relevant FDA guidance document states that the loss on a coated substrate subjected to an abrasion wear resistance test should be less than a total of 65 milligrams by weight when abraded for 100 cycles. As noted above, the highest individual weight lost when abraded for 100 cycles was 64 milligrams, and, therefore, the test samples that had been coated in accordance with the exemplary methods described herein satisfied the relevant FDA guidance document.

Prosthesis Core Tensile Strength

Testing for tensile strength was performed generally in accordance with ASTM D638-22, Type V. Samples of the appropriate size for this test were taken from the coated and uncoated sides of pucks prepared as described above, and both samples that had not been subjected to accelerated aging and samples that had been subjected to accelerated aging were tested. Five samples of each type were tested in accordance with the procedure set out in ASTM D638-22, Type V.

Among samples taken from the coated face that had not been subjected to accelerated aging, the mean measured tensile strength was 42.4 MPa. Among samples taken from the uncoated face that had not been subjected to accelerated aging, the mean measured tensile strength was 42.4 MPa. Among samples taken from the coated face that were subjected to accelerated aging, the mean measured tensile strength was 40.5 MPa. Among samples taken from the uncoated face that were subjected to accelerated aging, the mean measured tensile strength was 45.1 MPa.

Prosthesis Core Compressive Modulus

Testing for compressive modulus was performed generally in accordance with ASTM D695-15. Samples of the appropriate size for this test were taken from the bulk (e.g., the center region away from either the coated or uncoated faces) of pucks prepared as described above, and both samples that had not been subjected to accelerated aging and samples that had been subjected to accelerated aging were tested. Five samples of each type were tested in accordance with the procedure set out in ASTM D695-15. Among samples that had not been subjected to accelerated aging, the mean measured compressive modulus was 1.04 GPa. Among samples that were subjected to accelerated aging, the mean measured compressive modulus was 1.03 MPa, i.e., a decrease of about 1% as compared to the samples that had not been subjected to accelerated aging.

Small Punch Testing

Small punch testing for the determination of mechanical behavior was performed generally in accordance with ASTM F2977-20. Samples of the appropriate size for this test were taken from the coated face, the uncoated face, and the bulk of pucks prepared as described above, and both samples that had not been subjected to accelerated aging and samples that had been subjected to accelerated aging were tested. Five samples of each type were tested. For all samples that had not been subjected to accelerated aging, the mean peak load measured was 74.6 Newtons. For all samples that were subjected to accelerated aging, the mean peak load measured was 73.9 Newtons, i.e., a decrease of about 1% as compared to the samples that had not been subjected to accelerated aging.

Impact Resistance

Izod impact resistance testing was performed generally in accordance with ASTM D256-23e1. Because UHMWPE is highly impact resistant, when tested in accordance with ASTM D256, Method A, UHMWPE generally gives a non-break type for failure, rendering the test result invalid. As such, the test method utilized for the testing described herein introduces a higher degree of stress concentration by double notching the test samples with a razor blade. Samples of the appropriate size for this test were taken from the bulk (e.g., the center region away from either the coated or uncoated faces) of pucks prepared as described above, and both samples that had not been subjected to accelerated aging and samples that had been subjected to accelerated aging were tested. Five samples of each type were tested in accordance with the procedure set out in ASTM D256-23c1. Among samples that had not been subjected to accelerated aging, the mean measured impact strength was 70.2 kJ/m$^2$. Among samples that were subjected to accelerated aging, the mean impact strength was 68.3 kJ/m$^2$, i.e., a decrease of about 3% as compared to the samples that had not been subjected to accelerated aging.

Oxidation Index

Oxidation testing was performed using infrared spectroscopy generally in accordance with ASTM F2102-17. Samples of the appropriate size for this test were taken from the coated face, the uncoated face, and the bulk of pucks prepared as described above, and both samples that had not been subjected to accelerated aging and samples that had been subjected to accelerated aging were tested. 75 data points were taken. Among samples that had not been subjected to accelerated aging, the mean surface oxidation index was 0.05 on the coated face and 0.08 on the uncoated face, and the mean bulk oxidation index was 0.02. Among samples that were subjected to accelerated aging, the mean surface oxidation index was 0.17 on the coated face and 0.17 on the uncoated face, and the mean bulk oxidation index was 0.04.

Trans-Vinylene Index

The number of trans-vinylene groups was analyzed by infrared spectroscopy generally in accordance with ASTM F2381-19. Samples of the appropriate size for this test were taken from the coated face, the uncoated face, and the bulk of pucks prepared as described above, and both samples that had not been subjected to accelerated aging and samples that had been subjected to accelerated aging were tested. 75 data points were taken Among samples that had not been subjected to accelerated aging, the mean surface trans-vinylene index was 0.04 on the coated face and 0.04 on the uncoated face, and the mean bulk trans-vinylene index was 0.03. Among samples that were subjected to accelerated aging, the mean surface trans-vinylene index was 0.04 on the coated face and 0.04 on the uncoated face, and the mean bulk trans-vinylene index was 0.03.

Crystallinity

Crystallinity was determined using differential scanning calorimetry (DSC) generally in accordance with ASTM F2625-10 (2016). Samples of the appropriate size for this test were taken from the uncoated face, the coated face, and the bulk of pucks prepared as described above, which had not been subjected to accelerated aging. Three samples of each type were tested in accordance with the procedure set out in ASTM F2625-10 (2016). The mean determined crystallinity was 62.8% for the coated face, 63.8% for the uncoated face, and 62.5% for the bulk.

Crosslink Density

Crosslink density was determined by measuring the swelling ratio of samples immersed in o-xylene generally in accordance with ASTM F2214-16. Samples of the appropriate size for this test were taken from the uncoated face, the coated face, and the bulk of pucks prepared as described above, which had not been subjected to accelerated aging. Three samples of each type were tested in accordance with the procedure set out in ASTM F2214-16. The mean crosslink density was 0.18 mol/dm$^3$ for the coated face, 0.18 mol/dm$^3$ for the uncoated face, and 0.17 mol/dm$^3$ for the bulk.

The terminology used herein is intended to describe embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components. Ranges described herein are inclusive, i.e., a range of 5 to 10 includes 5, 10, and all values therebetween.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A device, comprising:
    a prosthesis core,
        wherein the prosthesis core is a cup-shaped core having a first side and a second side,
        wherein the first side is concave, and
        wherein the second side is convex,
    wherein the prosthesis core comprises ultra-high molecular weight polyethylene,
        wherein the ultra-high molecular weight polyethylene has a weight average molecular weight that is in a range of from $2\times10^6$ grams per mole to $3\times10^6$ grams per mole, and
    wherein the prosthesis core has a tensile strength that is in a range of from 35 MPa to 50 MPa; and
    a coating layer that coats the second side of the prosthesis core,
        wherein the coating layer comprises titanium powder,
            wherein the titanium powder has a D50 particle size that is in a range of from 200 microns to 250 microns,
        wherein the coating layer has a mean thickness that is in a range of from 200 to 500 microns,
    wherein the device is an acetabular cup prosthesis,
    wherein the coating layer has sufficient abrasion resistance such that, when tested for abrasion resistance in accordance with ASTM F1978-22, the coating layer loses less than 65 milligrams when abraded for 100 cycles,
    wherein the coating layer has a static shear bond strength that is in a range of from 15 MPa to 25 MPa, and
    wherein the coating layer has a static tensile bond strength that is in a range of from 14 MPa to 25 MPa.

2. The device of claim 1, wherein the ultra-high molecular weight polyethylene is vitamin E enriched.

3. The device of claim 2, wherein the ultra-high molecular weight polyethylene has a vitamin E concentration that is in a range of 1,000 parts per million to 5,000 parts per million.

4. The device of claim 1, wherein the first side of the prosthesis core is sized to articulate with a patient's native femoral head.

5. The device of claim 1, wherein the first side of the prosthesis core is sized to articulate with a prosthetic femoral head.

6. The device of claim 1, wherein the coating layer has a mean arithmetic average surface roughness Ra that is in a range of from 35 microns to 45 microns.

7. The device of claim 1, wherein the prosthesis core has sufficient small punch strength such that, when tested for small punch strength in accordance with a small punch test, the prosthesis core has a peak load that is in a range of from 70 Newtons to 80 Newtons.

8. The device of claim 1, wherein the prosthesis core has sufficient fatigue crack resistance such that, when tested for fatigue crack propagation in accordance with a fatigue crack propagation test, the prosthesis core has a Paris exponent m that is in a range of from 6 to 7 and a Paris coefficient C that is in a range of from $8\times10^{-6}$ to $11.5\times10^{-6}$.

9. The device of claim 1, wherein the prosthesis core has a compressive modulus that is in a range of from 0.8 GPa to 1.2 GPa.

10. The device of claim 1, wherein the first side of the prosthesis core has an oxidation index that is in a range of from 0.06 to 0.1.

11. The device of claim 1, wherein the prosthesis core has a trans-vinylene index that is in a range of from 0.025 to 0.045.

12. The device of claim 1, wherein the prosthesis core has a crystallinity percentage that is in a range of from 55% to 70%.

13. The device of claim 1, wherein the prosthesis core has an impact strength that is in a range of from 65 kJ/m$^2$ to 75 kJ/m$^2$.

14. The device of claim 1, wherein the prosthesis core has a crosslink density that is in a range of from 0.15 mol/dm$^3$ to 0.2 mol/dm$^3$.

* * * * *